US008824605B2

(12) United States Patent
Kato et al.

(10) Patent No.: US 8,824,605 B2
(45) Date of Patent: Sep. 2, 2014

(54) RECEIVING DEVICE, RECEIVING METHOD, RECEIVING PROGRAM, AND PROCESSOR

(75) Inventors: Katsuya Kato, Osaka (JP); Takashi Yoshimoto, Osaka (JP); Ryota Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/583,187

(22) PCT Filed: Mar. 2, 2011

(86) PCT No.: PCT/JP2011/054754
§ 371 (c)(1),
(2), (4) Date: Sep. 6, 2012

(87) PCT Pub. No.: WO2011/111583
PCT Pub. Date: Sep. 15, 2011

(65) Prior Publication Data
US 2013/0003901 A1  Jan. 3, 2013

(30) Foreign Application Priority Data

Mar. 8, 2010 (JP) ................ P2010-050849

(51) Int. Cl.
*H04L 27/06* (2006.01)
*H04L 25/03* (2006.01)
*H04B 17/00* (2006.01)
(52) U.S. Cl.
CPC . *H04L 25/03006* (2013.01); *H04L 2025/03414* (2013.01); *H04B 17/005* (2013.01); *H04B 17/0055* (2013.01); *H04B 17/0042* (2013.01); *H04B 17/009* (2013.01)
USPC ........... 375/341; 375/348; 375/144; 375/350; 375/260; 375/346; 455/273
(58) Field of Classification Search
CPC .................................... H04B 7/0413

USPC ................. 375/341, 348, 144, 350, 260, 346; 455/273
See application file for complete search history.

(56) References Cited

U.S. PATENT DOCUMENTS

2005/0259721 A1\* 11/2005 Kawamoto et al. ........... 375/144
2006/0262869 A1\* 11/2006 Yoshida ........................ 375/260
(Continued)

FOREIGN PATENT DOCUMENTS

| EP | 2 023 519 A1 | 2/2009 |
| JP | 2003-218826 A | 7/2003 |

(Continued)

OTHER PUBLICATIONS

Kato et al. (Katsuya Kato et al., "Multipath Division Turbo Equalization with Block Inter-Carrier Interference Cancellation in Cellular System with Amplify-and-Forward Relaying", 2009, IEEE, total of 5 pages).\*

(Continued)

*Primary Examiner* — Sam K Ahn
*Assistant Examiner* — Fabricio R Murillo Garcia
(74) *Attorney, Agent, or Firm* — Birch, Stewart, Kolasch & Birch, LLP

(57) ABSTRACT

A propagation channel estimation unit estimates a propagation channel estimation value. A symbol replica generation unit generates a symbol replica that is modulated symbol of a demodulated information. A signal extraction unit extracts, in an arbitrary time duration, each subcarrier component of a received signal in which an interference signal was removed, the extraction being made based on the propagation channel estimation value and the symbol replica. A demodulator demodulates a signal of each subcarrier component in the received signal, the demodulation being made based on signal during the time duration extracted by the signal extraction unit.

18 Claims, 12 Drawing Sheets

(56) References Cited

U.S. PATENT DOCUMENTS

2009/0141834 A1* 6/2009 Imamura et al. .............. 375/341
2012/0099679 A1 4/2012 Yamada et al.

FOREIGN PATENT DOCUMENTS

| JP | 2010-288140 A | 12/2010 |
| JP | 2011-109238 A | 6/2011 |
| JP | 2011-124839 A | 6/2011 |
| WO | WO 2007/139145 A1 | 12/2007 |

OTHER PUBLICATIONS

Shimezawa et al. (Kazuyuki Shimezawa et al., "A Novel SC/MMSE Turbo Equalization for Multicarrier Systems with Insufficient Cyclic Prefix", 2008, IEEE, total of 5 pages).*

International Search Report, dated Apr. 5, 2011, issued in PCT/JP2011/054754.

Kato et al., "Multipath Division Turbo Equalization with Block Inter-Carrier Interference Cancellation in Cellular System with Amplify-and-Forward Relaying", Proc. IEEE PIMRC 2009, pp. 2656-2660, Sep. 2009.

Written Opinion of the International Searching Authority, dated Apr. 5, 2011, issued in PCT/JP2011/054754.

Katsuya Kato, et al. "Multipath Division Turbo Equalization with Block Inter-carrier Interference Cancellation with Low Sensitivity of Residual Error Caused by Soft Replica" IEICE Technical Report RCS 2009-155 (Nov. 2009), p. 133-138.

Ryota Yamada, et al. "Study on Multipath Division Turbo Equalization with Block ICI Cancellation for MIMO Transmission" IEICE Technical Report RCS 2009-174 (Dec. 2009), pp. 43-48.

* cited by examiner

RECEIVING DEVICE, RECEIVING METHOD, RECEIVING PROGRAM, AND PROCESSOR

TECHNICAL FIELD

The present invention relates to a receiving device, a receiving method, a receiving program, and a processor.

The subject application claims priority based on the patent application No. 2010-050849 filed in Japan on Mar. 8, 2010 and incorporates by reference herein the content thereof.

BACKGROUND ART

In wireless communication, and particularly in broadband transmission, in addition to a first reception path, there are paths that arrive with a delay, by reflections from obstacles such as buildings and mountains, thereby resulting in intersymbol interference (ISI). An environment such as this having a plurality of paths of arrival is known as a multipath environment. For example, in multicarrier transmission, such as in OFDM (orthogonal frequency division multiplexing), OFDMA (orthogonal frequency division multiple access), and MC-CDM (multicarrier code division multiplexing), a guard interval (GI) is added to the multicarrier time-domain signal so as to prevent ISI, as long as the delay path is within the GI. However, if a delay path exists that exceeds the GI, in addition to ISI, intercarrier interference (ICI) occurs because the periodicity of the FFT (fast Fourier transform) is destroyed. ISI and ICI greatly worsen the receiving performance.

Non-Patent Document 1 describes a technique of for reducing ISI and ICI by

Non-Patent Document 1 describes a technique of for reducing ISI and ICI by using turbo equalization. Specifically, the Non-Patent Document 1 describes the generation of a transmitted signal replica from the bit-log likelihood ratio (LLR) of the results of error correction decoding, and the use thereof to divide the multiple path received signal into a plurality of blocks and process only the desired signal in the frequency band, so as to suppress ISI and ICI, thereby achieving good receiving quality.

PRIOR ART DOCUMENT

Non-Patent Document

Non-Patent Document 1: K. Kato, R. Yamada, T. Yoshimoto, K Shimezawa, M. Kubota, and N. Okamoto, "Multipath Division Turbo Equalization with Block Inter-Carrier Interference Cancellation in Cellular System with Amplify-and-Forward Relaying" in Proc. IEEE PIMRC 2009, September, 2009.

DISCLOSURE OF INVENTION

Problem to be Solved by the Invention

However, in Non-Patent Document 1, because a plurality of blocks are converted to the frequency domain, and there are problems of a large number of FFTs and an increase in the amount of calculation.

The present invention was made in consideration of the above-noted points, and provides a receiving device, a receiving method, a receiving program, and a processor that are capable of obtaining good receiving performance, while suppressing an increase in the amount of calculation and circuit scale.

Means to Solve the Problem (1) The present invention was made to solve the above-described problem, a first aspect of the present invention is a receiving device including: a signal extraction unit configured to extract a signal of an arbitrary time duration using a received signal and a received signal replica that is a replica of the received signal in the time domain obtained from a bit-log likelihood ratio obtained by receiving processing at least one time, and perform a time-to-frequency transform on the extracted signal so as to obtain each subcarrier signal of the received signal, in which at least intercarrier interference is suppressed.

(2) In the first aspect of the present invention, the receiving device may further include: a propagation channel estimation unit configured to estimate a propagation channel so as to determine a propagation channel estimation value; and a symbol replica generation unit configured to generate a symbol replica that is a replica of a modulated symbol from the bit-log likelihood ratio; wherein the signal extraction unit may include: a filter unit configured to generate the received signal replicas, based on the propagation channel estimation value and the symbol replicas; a subtraction unit configured to subtract the received signal replicas from the received signals; an extended FFT duration extraction unit configured to extract from the signal subtracted by the subtraction unit an extended FFT duration signal that is a signal of time durations of arbitrary length so as to generate an FFT signal from the extended FFT duration signal; a time-to-frequency transformation unit configured to transform the FFT signal into a frequency-domain signal; and a reconstruction unit configured to generate a subcarrier replica signal, based on the propagation channel estimation value and the symbol replica, and add the subcarrier replica signal to the frequency-domain signal transformed by the time-to-frequency transformation unit, so as to obtain each subcarrier signal of the received signal.

(3) In the first aspect of the present invention, the receiving device may further include: a propagation channel estimation unit configured to estimate a propagation channel so as to determine a propagation channel estimation value; and a symbol replica generation unit configured to generate a symbol replica that is a replica of a modulated symbol from the bit-log likelihood ratio; wherein the signal extraction unit may include: a filter unit configured to generate the received signal replicas, based on the propagation channel estimation value and the symbol replicas; an extended FFT duration extraction unit configured to extract an extended FFT duration signal that is a signal of time durations of arbitrary length so as to generate an FFT duration signal from the extended FFT duration signal; a time-to-frequency transformation unit configured to transform into a frequency-domain signal a first FFT duration signal generated from the received signal and a second FFT duration signal generated from the received signal replica; a subtraction unit configured to subtract the second FFT duration signal of the frequency-domain from the first FFT duration signal of the frequency-domain; and a reconstruction unit configured to generate a subcarrier replica signal, based on the propagation channel estimation value and the symbol replica, and add the subcarrier replica signal with respect to the signals subtracted by the subtraction unit, and extract each of the subcarrier components of the received signals in an arbitrary time duration.

(4) In the first aspect of the present invention, the filter unit may generate the received signal replicas, based on symbol replicas on which the frequency-to-time transformation has been performed and the propagation channel estimation value.

(5) In the first aspect of the present invention, the duration length of the extended FFT duration signal is longer than that of the FFT duration signal.

(6) In the first aspect of the present invention, the FFT duration signal may include signals longer than the duration length of the FFT duration signal of the extended FFT duration signals.

(7) In the first aspect of the present invention, a starting position of the time duration of the extended FFT duration signal may be different from a starting time of the FFT duration signal.

(8) In the first aspect of the present invention, a starting position of the time duration of the extended FFT duration signal may be the same as a starting position of the FFT duration signal.

(9) In the first aspect of the present invention, the extended FFT duration signal may take a starting of a time duration extracting a signal as a leading edge of a previous path and takes an ending of the time duration as a trailing edge of a maximum-delay path signal.

(10) In the first aspect of the present invention, the extended FFT duration extraction unit may multiply the extracted signal duration by a window function.

(11) In the first aspect of the present invention, the reconstruction unit may extract a subcarrier component of the frequency-domain signal transformed by the time-to-frequency transformation unit, and add to a signal of the extracted subcarrier component the subcarrier components of the replica signals of the desired signals.

(12) In the first aspect of the present invention, the reconstruction unit may extract a subcarrier component of the frequency-domain signal transformed by the time-to-frequency transformation unit, and add to a signal of the extracted subcarrier component a subcarrier component that is the subcarrier component of the replica signals of the desired signals and that is in proximity to the subcarrier.

(13) In the first aspect of the present invention, the receiving device may include a plurality of antennas and performs communication with a transmission device by MIMO transmission.

(14) In the first aspect of the present invention, the demodulator may perform MIMO separation based on the propagation channel estimation value.

(15) In the first aspect of the present invention, the receiving device may receive, as the received signals, signals of signal streams transmitted from each of a plurality of antennas of the transmission device; and the signal extraction unit may include: a filter unit configured to generate received signal replicas that are replicas of the received signals in the time domain, based on the propagation channel estimation value and the symbol replicas; a subtraction unit configured to subtract the received signal replicas from the received signals; an extended FFT duration extraction unit configured to extract from the signal subtracted by the subtraction unit a signal of a time duration of an arbitration length; a time-to-frequency transformation unit configured to transform the signal of time duration extracted by the extended FFT duration extraction unit into a frequency-domain signal; and a reconstruction unit configured to generate a replica signal of the desired signal, based on the propagation channel estimation value and the symbol replica, add the replica signal of the desired signal to the frequency-domain signal that has been transformed by the time-to-frequency transformation unit, and extract each subcarrier signal component of the received signal in a time duration of an arbitrary length; wherein the reconstruction unit may extract the subcarrier component of the frequency-domain signal transformed by the time-to-frequency transformation unit, and add to the signal of the extracted subcarrier component a desired stream component of the subcarrier component of a replica signal of the desired signal.

(16) In the first aspect of the present invention, the receiving device may receive, as the received signals, signals of signal streams transmitted from each of a plurality of antennas of the transmission device; and the signal extraction unit may include: a filter unit configured to generate received signal replicas that are replicas of the received signals in the time domain, based on the propagation channel estimation value and the symbol replicas; a subtraction unit configured to subtract the received signal replicas from the received signals; an extended FFT duration extraction unit configured to extract from the signal subtracted by the subtraction unit a signal of time duration of an arbitration length; a time-to-frequency transformation unit configured to transform the signal of time duration extracted by the extended FFT duration extraction unit into a frequency-domain signal; and a reconstruction unit configured to generate a replica signal of the desired signal, based on the propagation channel estimation value and the symbol replica, add the replica signal of the desired signal to the frequency-domain signal that has been transformed by the time-to-frequency transformation unit, and extract each subcarrier signal component of the received signal in a time duration of an arbitrary length, wherein the reconstruction unit may extract the subcarrier component of the frequency-domain signal transformed by the time-to-frequency transformation unit, and add to the signal of the extracted subcarrier component all of the stream components of the subcarrier components of a replica signal of the desired signal.

(17) In the first aspect of the present invention, the demodulator may demodulate a signal using the minimum mean square error reference.

(18) A second aspect of the present invention is a receiving method including: extracting, by a signal extraction unit, a signal of an arbitrary time duration using a received signal and a received signal replica that is a replica of the received signal in the time domain obtained from a bit-log likelihood ratio obtained by receiving processing at least one time, and performing a time-to-frequency transform on the extracted signal so as to obtain each subcarrier signal of the received signal, in which at least intercarrier interference is suppressed.

(19) A third aspect of the present invention is a receiving program causing a computer of a receiving device to perform: extracting a signal of an arbitrary time duration using a received signal and a received signal replica that is a replica of the received signal in the time domain obtained from a bit-log likelihood ratio obtained by receiving processing at least one time, and performing a time-to-frequency transform on the extracted signal so as to obtain each subcarrier signal of the received signal, in which at least intercarrier interference is suppressed.

(20) A fourth aspect of the present invention is a processor performing: extracting a signal of an arbitrary time duration using a received signal and a received signal replica that is a replica of the received signal in the time domain obtained from a bit-log likelihood ratio obtained by receiving processing at least one time, and performing a time-to-frequency transform on the extracted signal so as to obtain each subcarrier signal of the received signal, in which at least intercarrier interference is suppressed.

(21) A fifth aspect of the present invention is a receiving method in a receiving device that receives a transmitted signal in which a guard interval has been added to demodulate a demodulation symbol from the received signal that has been received, the receiving method including: obtaining an FFT duration signal using an extended FFT duration longer than the usual FFT duration or setting a position different from the usual position.

Effect of the Invention

According to the present invention, it is possible to achieve good receiving performance while suppressing an increase in the amount of calculations and the circuit scale.

BRIEF DESCRIPTION OF THE DRAWINGS

BEST MODE FOR CARRYING OUT THE INVENTION (First Embodiment)
The first embodiment of the present invention will be described below, with references made to the drawings. In the present embodiment, the transmitting device a1 and the receiving device b1 communicate.
<Constitution of the Transmitting Device a1>
FIG. 1 is a simplified block diagram that shows the transmitting device a1 according to the first embodiment of the present invention. In this drawing, the transmitting device a1 is constituted so as to include a pilot generation unit a101, a coding unit a102, a modulator a103, a mapping unit a104, an IFFT unit a105, a GI insertion unit a106, a transmitting unit a107, and a transmitting antenna a108.

Figure 1:
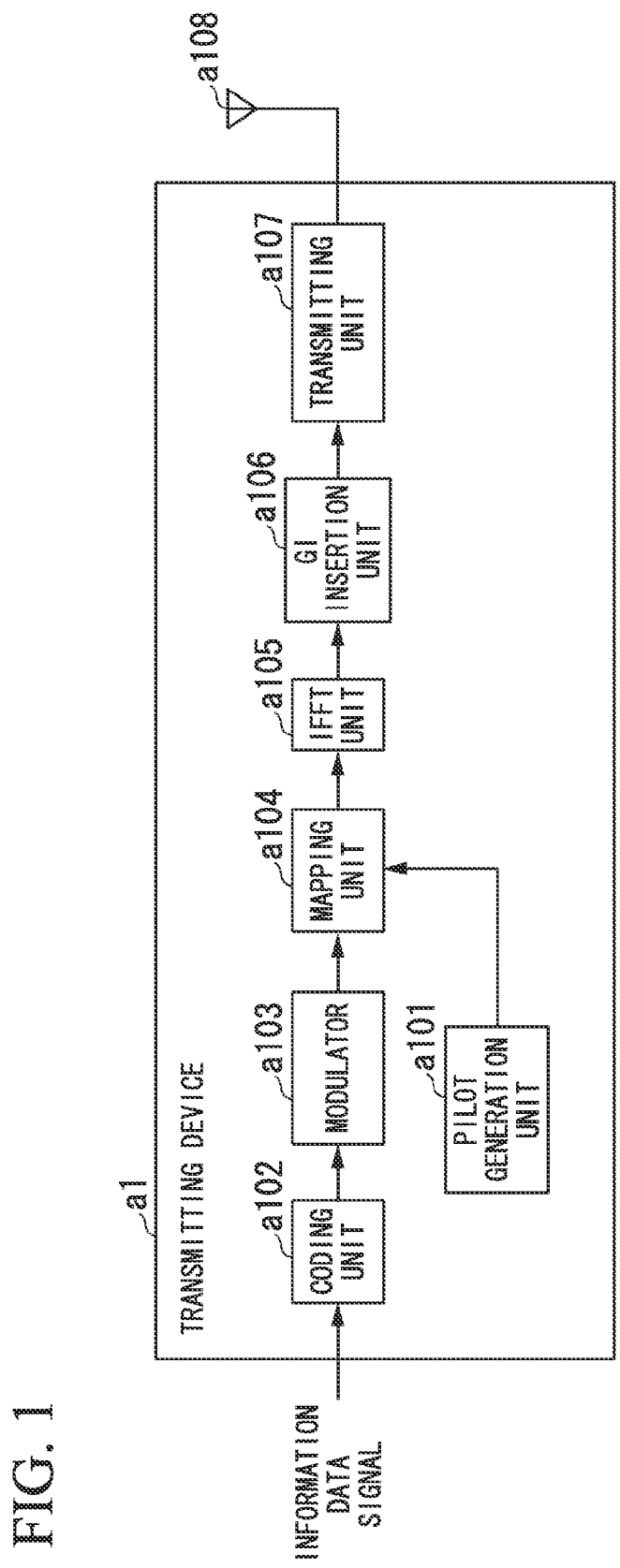
FIG. 1 is a simplified block diagram of a transmitting device according to a first embodiment of the present invention.

The pilot generation unit a101 generates a pilot signal, the amplitude value of the waveform (or signal stream) of which is stored by the receiving device beforehand, and outputs it to the mapping unit a104. In the present embodiment, the receiving device is referred to as b1.

The coding unit a102 codes the information bits to be transmitted to the receiving device b1, using an error correction code such as convolution code, a turbo code, or an LDPC (low-density parity check) code, and generates coded bits. The coding unit a102 outputs the generated coded bits to the modulator a103.

The modulator a103 modulates the coded bits input from the coding unit a102, using a modulation scheme such as PSK (phase shift keying) or QAM (quadrature amplitude modulation), and generates modulation symbols. The modulator a103 outputs the generated modulation symbols to the mapping unit a104.

The mapping unit a104 maps the pilot signal input from the pilot generation unit a101 and the modulation symbols input from the modulator a103, based on pre-established mapping information onto resources (time-frequency band), generates a frequency-domain signal, and outputs the generated frequency-domain signal to the IFFT unit a105. Resources are units of placement of modulation symbols, constituted by one subcarrier and one FFT duration, to be described later, in a frame transmitted by the transmitting device a1. The mapping information is decided by the transmitting device a1, and notified beforehand by the transmitting device a1 to the receiving device b1.

The IFFT unit a105 performs a frequency-to-time transformation of the frequency-domain signal input from the mapping unit a104 to generate a time-domain signal. Herein, the time duration unit in which the IFFT is performed is called the FFT duration. The IFFT unit a105 outputs the generated time-domain signal to the GI insertion unit a106.

The GI insertion unit a106 adds a guard interval to the time-domain signal input from the IFFT unit a105, for each signal of an FFT duration. In this case, the guard interval is a known signal that uses a cyclic prefix (CP) or zero padding in which zero duration is padded, which is copy of a part of the rear of the signal of an FFT duration, or a Golay code or the like. The GI insertion unit a106 adds a signal such as this to the front of the signal of the FFT duration.

The FFT duration and the time duration (GI duration) of the guard interval added to the signal of the time duration by the GI insertion unit a106 are collectively referred to as the OFDM symbol duration. The signal of the OFDM symbol duration is called the OFDM symbol. The GI insertion unit a106 outputs the signal to which the guard interval has been added to the transmitting unit a107.

The guard interval may be inserted at the rear of the FFT duration. In the case of using a cyclic prefix, for example, a partial copy of the front of the FFT duration is added to the rear of the signal of the FFT duration. In the case of the cyclic prefix, as long as the periodicity of the OFDM symbol duration is maintained, there is no restriction to the above.

Figure 2:
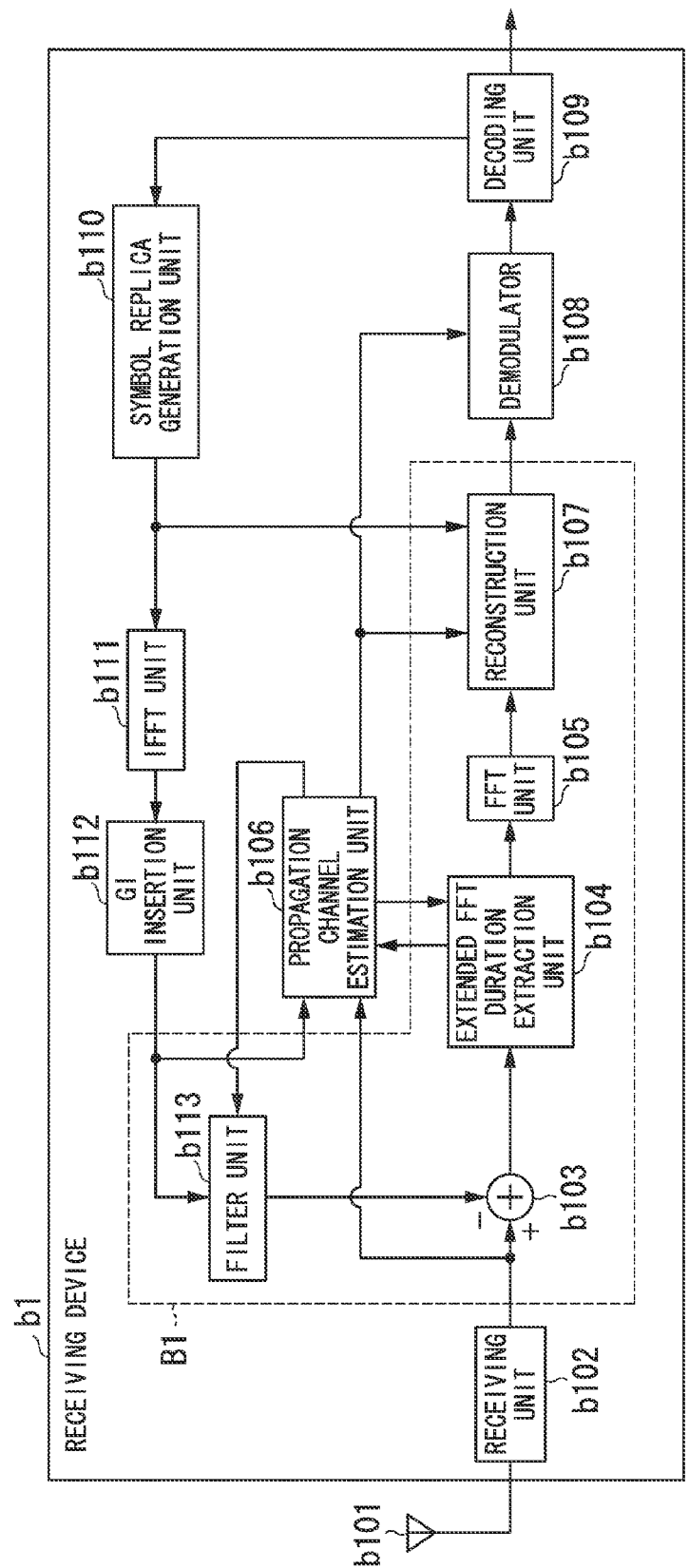
FIG. 2 is a simplified block diagram showing the constitution of a receiving device according to the present embodiment.

The transmitting unit a107 performs a digital-to-analog conversion of the signal input from the GI insertion unit a106, and wave-shapes the converted analog signal. The transmitting unit a107 up-converts the wave-shaped signal from the baseband to the wireless frequency band, and transmits it from a transmitting antenna a108 to the receiving device b1.
<Constitution of the Receiving Device b1>
FIG. 2 is a simplified block diagram showing the constitution of the receiving device b1 according to the present embodiment. In this drawing, the receiving device b1 is constituted so as to include a receiving antenna b101, a receiving unit b102, a subtraction unit b103, an extended FFT duration extraction unit b104, an FFT unit b105, a propagation channel estimation unit b106, a reconstruction unit b107, a demodulator b108, a decoding unit b109, a symbol replica generation unit b110, an IFFT unit b111, a GI insertion unit b112, and a filter unit b113. In this case, the subtraction unit b103, the extended FFT duration extraction unit b104, the FFT unit b105, the reconstruction unit b107, and the filter unit a113 are referred to as the signal extraction unit B1.

The receiving unit b102 receives the transmitted signal transmitted by the transmitting device a1 via the receiving antenna b101. The receiving unit b102 performs frequency conversion and analog-to-digital conversion of the received signal and stores the converted received signal. At the first-time processing and at the timing of input of the received signal replica to the subtraction unit b103 by the filter unit b113, which will be described later, the receiving unit b102 outputs the converted received signal to be stored to the subtraction unit b103 and to the propagation channel estimation unit b106.

The subtraction unit b103 subtracts from the received signal input from the receiving unit b102 the received signal replica input from the filter unit b113, which will be described later. The subtraction unit b103 outputs the signal from which the received signal replica has been subtracted to the extended FFT duration extracting unit b104.

Also, in the case of the first-time processing, there is no (that is, zero) input to the subtraction unit b103 from the filter unit b113, and the subtraction unit b103 outputs to the extended FFT duration extraction unit b104 the received signal input from the receiving unit b102 as is.

The extended FFT duration extraction unit b104, based on the channel impulse response input from the propagation channel estimation unit b106, which will be described later, outputs a signal of a signal processing duration such that the amount of interference is small to the FFT unit b105. Information indicating the signal processing duration of the extracted signal is output to the propagation channel estimation unit b106. Details of the processing will be described later, together with the operating principle.

The FFT unit b105 performs time-to-frequency transformation of the time-domain signal input from the extended FFT duration extraction unit b104, and outputs the transformed frequency-domain signal to the reconstruction unit b107.

The propagation channel estimation unit b106, based on the received signal input from the receiving unit b102 and the transmitted signal replica input from the GI insertion unit b112 that will be described later, estimates the channel impulse response in the OFDM symbol duration. In this case, the RLS (recursive least square) algorithm may be used for the estimation of the channel impulse response, and another algorithm, for example, the LMS (least mean square) algorithm may also be used. In the case of the first-time processing, there is no (that is, zero) input from the GI insertion unit b112 to the propagation channel estimation unit b106, and the propagation channel estimation unit b106 estimates the channel impulse response that varies with time in the OFDM symbol duration, based on the previously stored pilot signal, and the received signal input from the receiving unit b102.

The propagation channel estimation unit b106 outputs the estimated channel impulse response to the filter unit b113 and to the extended FFT duration extraction unit b104. The propagation channel estimation unit b106 also performs time-to-frequency transformation t of the signal processing duration indicated by information input from the expanded FFT duration extraction unit b104 with respect to the estimated channel impulse response, and estimates the frequency response. The propagation channel estimation unit b106 outputs the estimated frequency response to the reconstruction unit b107 and the demodulator b108.

The propagation channel estimation unit b106 uses the previously stored pilot signal to measure the noise power and the interference power in the subcarrier (referred to as the pilot subcarrier) in which the pilot signal is placed. The specific method of calculation will be described later, together with the operating principle.

For each subcarrier, the reconstruction unit b107 multiplies the frequency response input from the propagation channel estimation unit b106 by the symbol replica input from the symbol replica generation unit b110, which will be described later, so as to generate a replica signal of the desired signal that is affected by the propagation channel. The reconstruction unit b107, for each subcarrier, adds the generated replica signal to the signal input from the FFT unit b105. That is, the reconstruction unit b107 generates a replica signal of the desired signal, based on the propagation channel estimation value and the symbol replica, adds the replica signal of that desired signal to the frequency-domain signal that has been transformed by the FFT unit b105, and extracts each subcarrier signal component of the received signal.

The reconstruction unit b107 outputs to the demodulator b108 the signal to which the replica signal is added.

Also, in the case of the first-time processing, there is no (that is, zero) input to the reconstruction unit b107 from the symbol replica generation unit b110, and the reconstruction unit b107 outputs to the demodulator b108 the received signal input from the FFT unit b105 as is.

As described above, the signal extraction unit B1, based on the estimated propagation channel value and the symbol replica, removes the received signal replica from the received signal so as to reconstruct the desired signal, thereby extracting each subcarrier component of the received signal, from which ISI and ICI (interference) have been removed.

The demodulator b108 calculates filter coefficients, based on the ZF (zero forcing) reference and the MMSE (minimum mean square error) reference or the like, using the frequency response, the noise power, and the interference power, which have been input from the propagation channel estimation unit b106. The demodulator b108, using the calculated filter coefficients, performs compensation (called propagation channel compensation) of the variation of the amplitude and phase of the signal. The demodulator b108 de-maps the signal that has been propagation channel compensated, based on mapping information that is previously notified from the transmitting device a1, and performs demodulation processing of the de-mapped signal. The demodulator b108 outputs the bit-log likelihood ratio (LLR) of the result of the demodulation to the decoding unit b109.

The decoding unit b109 performs decoding processing of the demodulated symbols input from the demodulator b108 using, for example, maximum likelihood decoding (MLD), maximum a posteriori probability (MAP), log-MAP, Max-log-MAP, or SOVA (soft output Viterbi algorithm).

As the result of the decoding processing, if the determination is made that an error has not been detected, or that processing has been performed a prescribed number of times, the decoding unit b109 outputs the bit-log likelihood ratio of the result of decoding as information data bits. However, if the determination is made that an error has been detected and also that the processing has not been performed the prescribed number of times, the decoding unit b109 outputs the bit-log likelihood ratio of the result of decoding to the symbol replica generation unit b110.

The symbol replica generation unit b110 calculates the expected value of the bit-log likelihood ratio input from the decoding unit b109, modulates the calculated expected value and generates a modulation symbol (called the symbol replica). The symbol replica generation unit b110 maps the generated symbol replica based on the mapping information that was notified from the transmitting device a1 beforehand. The symbol replica generation unit b110 outputs the mapped symbol replica to the reconstruction unit b107 and the IFFT unit b111.

The IFFT unit b111 performs frequency-to-time transformation of the symbol replica input from the symbol replica generation unit b110, and outputs the transformed time-domain replica signal to the GI insertion unit b112.

The GI insertion unit b112, for each signal in the FFT duration, adds a guard interval to the replica signal input from the IFFT unit b111, and generates the transmitted signal replica. The GI insertion unit b112 outputs the generated transmitted signal replica to the propagation channel estimation unit b106 and the filter unit b113.

The filter unit b113 generates the received signal replica, based on the channel impulse response input from the propagation channel estimation unit b106 and the transmitted signal replica input from the GI insertion unit b112. The filter unit b113 outputs the generated received signal replica to the subtraction unit b103.

With respect to the same signal, the receiving device b1 repeats the processing (called iterative processing) from the above-noted subtraction unit b103 to the filter unit b113, until the decoding unit b109 detects no error or until a prescribed number of times.

Figure 3:
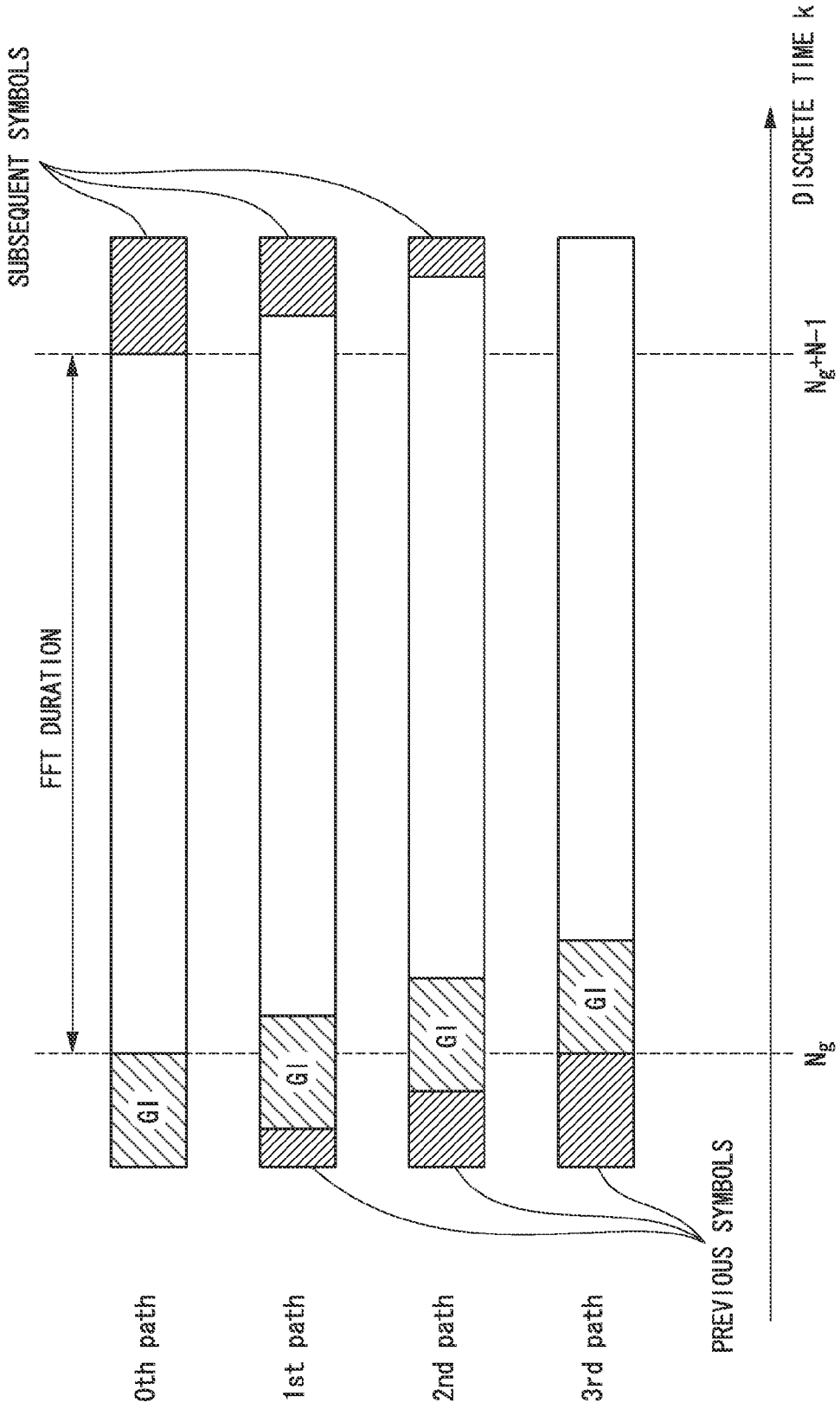
FIG. 3 is a simplified drawing showing an example of the received signal according to the present embodiment.

FIG. 3 is a simplified drawing of an example of a received signal in the present embodiment. This drawing shows the case in which the maximum delay does not exceed the GI length, and there is no interference from the previous OFDM symbol. In this drawing, the horizontal axis is the time axis, which represents the discrete times of divisions into pre-established time widths. In this drawing, the regions with hatching lines inclined upwardly to the right indicate guard intervals, and the regions with hatching lines inclined upwardly to the left indicate the received signals of an OFDM symbol before and after. The symbol N indicates the number of FFT (fast Fourier transform) duration points (which is also the number of IFFT (inverse fast Fourier transform) duration points), and $N_g$ is the number of GI points. In this case, the number of points is the number of discrete times.

In the case of FIG. 3, the extended FFT duration extraction unit b104 extracts a signal of the signal processing duration as a part of a signal corresponding to an FFT duration of a leading waveform ($k=N_g$ to $N_g+N-1$). The extended FFT duration extraction unit b104 inputs the extracted signal to the FFT unit b105. By doing this, the receiving device b1 can extract a signal in which no interference occurs from a previous or subsequent OFDM symbol.

Figure 4:
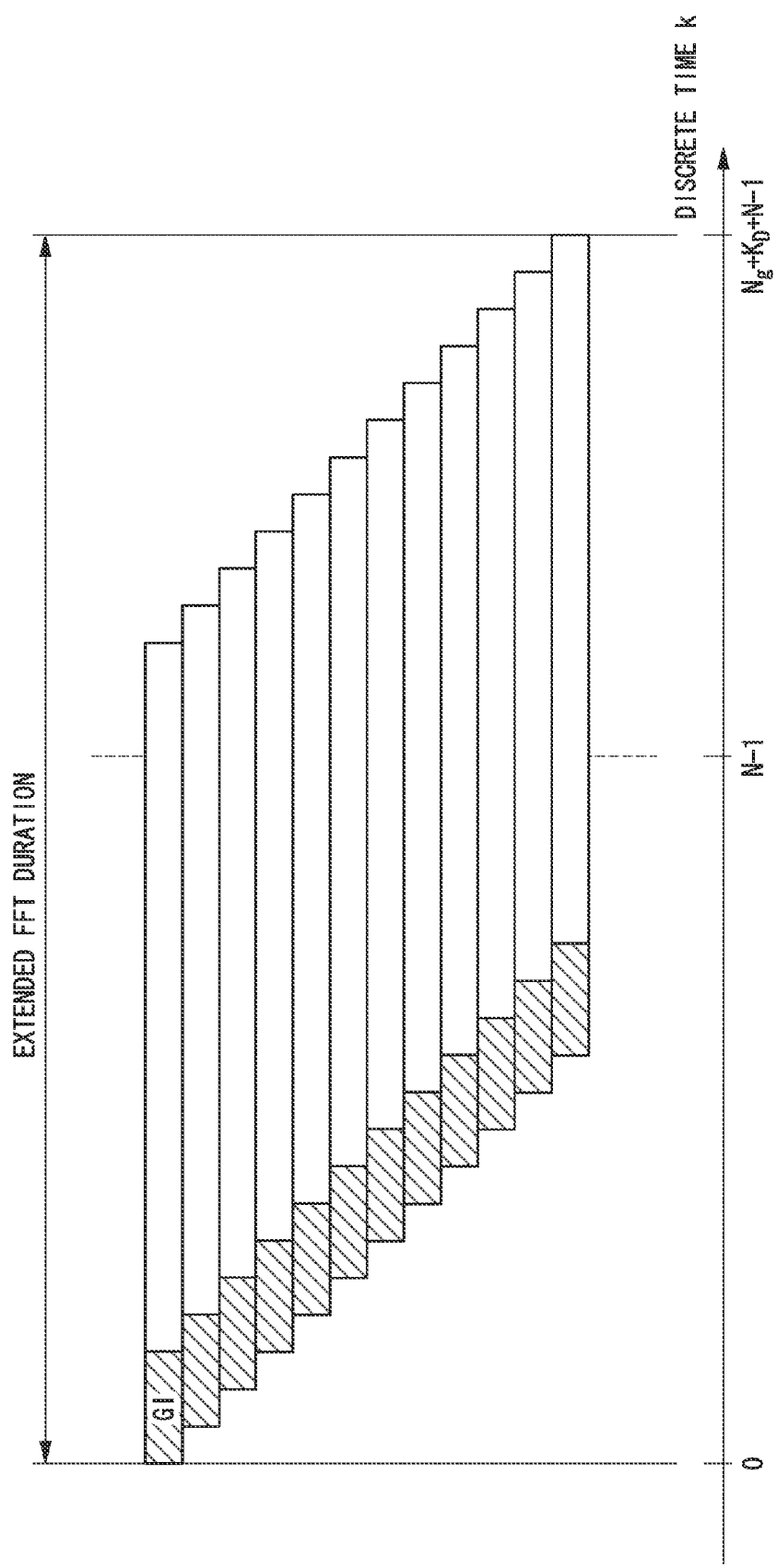
FIG. 4 is a simplified drawing showing an example of FFT durations selected by the receiving device according to the present embodiment.

FIG. 4 is a simplified drawing showing an example of the FFT durations selected by the receiving device b1 according to the present embodiment. In this drawing, case shown is one in which the maximum delay time exceeds the GI length, and there is interference from the previous OFDM symbol. In this drawing, the horizontal axis is the time axis, which represents the discrete times of divisions into pre-established time widths, and the regions with hatching inclined upwardly to the right indicate GIs.

In the case of FIG. 4, as in the case of FIG. 3, there is no FFT duration in which no interference occurs from a previous or subsequent ODFM symbols. In this case, the extended FFT duration extraction unit b104 does not fix the number of points to N, and selects durations such that the interference is made small. For example, the extended FFT duration extraction unit b104 selects the extended FFT durations shown in FIG. 4 (k=0 to $N_g+K_D+N-1$). In this case, $K_D$ indicates the delay time (maximum delay time) on the maximum-delay path. This drawing shows when the extended FFT duration extraction unit b104 selects the time from the leading edge of the previous waveform path to the trailing edge of the maximum-delay path. In this drawing, 12 paths (including the previous wave paths) exist in the signal processing durations.

The extended FFT duration extraction unit b104 divides a selected extended FFT duration into a front duration where k=0 to N−1 and a rear duration where K=N to $N_g+K_D+N-1$. Additionally, the extended FFT duration extraction unit b104 selects a duration of length N, made up of a duration where k=0 to $N_g+K_D$, which is a part of the front duration, and the rear duration. The extended FFT duration extraction unit b104 outputs to the FFT unit b105 the signal in the signal processing duration, taking the selected durations as the signal processing duration. The processing will be described later, together with the operating principle.

A duration that is shorter than the usual FFT duration may be selected as the extended FFT duration.

<Operating Principle>

The operating principle of the receiving device b1 will be described below, with reference made to FIG. 2. The operating principle at the first-time processing will first be described.

[First-Time Processing]

The received signal $r_{i,k}$ at a k-th discrete time of the i-th symbol received by the receiving unit b102 is given by the following Equations (1) and (2).

$$r_{i,k} = \sum_{d=0}^{D} h_{i,d,k} s_{i,k-d} + z_{i,k} \tag{1}$$

$$s_{i,k} = \frac{1}{\sqrt{N}} \sum_{n=0}^{N-1} S_{i,n} \exp\left[j\frac{2\pi n}{N}(k-N_g)\right] \tag{2}$$

In the above, D is the maximum propagation channel number, and in this case, it is equal to the maximum delay time $K_D$. Also, $h_{i,d,k}$ is the complex amplitude at the k-th discrete time in the path (referred to as d-th path) of the propagation channel number d of the i-th symbol, $s_{i,k}$ is the time domain transmitted signal in the i-th symbol, and $z_{i,k}$ is the time-domain noise of the i-th symbol of the n-th subcarrier. N is the number of points in the FFT duration, $S_{i,n}$ is the modulation signal of the n-th subcarrier, $N_g$ is the number of points in the GI duration (refer to FIG. 4), and j is the unit of an imaginary number. Also, in the case of $0 \le k \le N+N_g-1$ and k−d<0, $s_{i,k-d} = s_{i-1,k-d+N+N_g}$.

With respect to the received signal $r_{i,k}$ of the FFT duration, the signal $R_{i,n}$ after time-to-frequency transformation by the FFT unit b105 is expressed by the following Equations (3) and (4).

$$R_{i,n} = \frac{1}{\sqrt{N}} \sum_{k=N_g}^{N_g+N-1} r_{i,k} \exp\left[-j\frac{2\pi n}{N}(k-N_g)\right] \tag{3}$$

$$= W_{i,n,n} S_{i,n} + \sum_{m=0, m \ne n}^{N-1} W_{i,n,m} S_{i,m} + \sum_{m=0}^{N-1} V_{i,n,m} S_{i-1,m} + Z_{i,n}$$

-continued $$W_{i,n,m} = \frac{1}{N}\sum_{d=0}^{N_g}\sum_{k=N_g}^{N_g+N-1} h_{i,d,k}\exp\left[-j\frac{2\pi(n-m)}{N}(k-N_g)\right]\exp\left(-j\frac{2\pi n}{N}d\right) + \qquad(4)$$

$$\frac{1}{N}\sum_{d=N_g+1}^{D}\sum_{k=d}^{N_g+N-1} h_{i,d,k}\exp\left[-j\frac{2\pi(n-m)}{N}(k-N_g)\right]\exp\left(-j\frac{2\pi n}{N}d\right)$$

In the above, $W_{i,n,m}$ is the coefficient of leakage of the signal from the m-th subcarrier into the n-th subcarrier, and if there is no variation in the propagation channel within one OFDM symbol ($h_{i,d,k}=h_{i,d}$) and also the maximum delay time is within the guard interval ($D \le N_g$), if m≠n, $W_{i,n,m}=0$. $V_{i,n,m}$ is the ISI coefficient from the immediately previous OFDM symbol, and $Z_{i,n}$ is the noise in the n-th subcarrier. In Equation (4), $W_{i,m,n}$ in the case of m=n is the frequency response of the n-th subcarrier, this being expressed by the following Equation (5).

$$W_{i,n,n} = \sum_{d=0}^{N_g}\left(\frac{1}{N}\sum_{k=N_g}^{N_g+N-1} h_{i,d,k}\right)\exp\left(-j\frac{2\pi n}{N}d\right) + \qquad(5)$$

$$\sum_{d=N_g+1}^{D}\left(\frac{1}{N}\sum_{k=d}^{N_g+N-1} h_{i,d,k}\right)\exp\left(-j\frac{2\pi n}{N}d\right)$$

Equation (5) coincides with the result of the discrete Fourier transform of the time average of the channel impulse response that varies with time within an OFDM symbol. At the first-time processing, the propagation channel estimation unit b106 estimates $W_{i,n,n}$ using the pilot signal. At the first-time processing, the signal indicated by Equation (3) is output as is from the FFT unit b105 to the demodulator b108, via the reconstruction unit b107. In the case, for example, of using MMSE criterion filtering, the demodulator b108 calculates the demodulation symbol $S'_{i,n}$ using the following Equation (6).

$$S'_{i,n} = \frac{W^*_{i,n,n}}{W^*_{i,n,n}W_{i,n,n} + \sigma_z^2 + \sigma_I^2} R_{i,n} \qquad(6)$$

In the above, Y* indicates the complex conjugate of Y. At the first-time processing, receiving processing without removing the ISI and the ICI causes deterioration of the transmission performance. Additionally, in Equation (6) $\sigma_z^2$ is the noise power, and $\sigma_I^2$ is the ISI and ICI power, which are expressed as the following Equations (7) and (8).

$$\sigma_z^2 = E[|Z_{i,n}|^2] \qquad(7)$$

$$\sigma_I^2 = E\left[\left|\sum_{m=0,m\ne n}^{N-1} W_{i,n,m}S_{i,m} + \sum_{m=0}^{N-1} V_{i,n,m}S_{i-1,m}\right|^2\right] \qquad(8)$$

In the above, E[X] is the ensemble mean of X. In the present embodiment, the propagation channel estimation unit b106 calculates these powers using the pilot signal, the results being used in Equation (6) to calculate the demodulation symbol $S'_{i,n}$. Specifically, the calculation is done as shown in the Equation (9).

$$\sigma'^2 = \left(\sum_{n\in P_i}|R_{i,n}|^2 - |P_i|\right)\bigg/|P_i| \qquad(9)$$

In the above, $\sigma'^2$ is the estimated value of $\sigma_z^2+\sigma_I^2$, and $P_i$ is a set that represents the pilot subcarriers in the i-th symbol. This is a calculation method whereby, if the calculated mean for a sufficient number of times is equal to the ensemble mean, the Equation (9) can be expressed as the following Equation (10).

$$\sigma'^2 = \frac{\left(\sum_{n\in P_i}|W_{i,n,n}S_{i,n}|^2 + \sum_{n\in P_i}\left|\sum_{m=0,m\ne n}^{N-1} W_{i,n,m}S_{i,m} + \sum_{m=0}^{N-1} V_{i,n,m}S_{i-1,m}\right|^2 + \sum_{n\in P_i}|Z_{i,n}|^2 - |P_i|\right)}{|P_i|} \qquad(10)$$

$$= \frac{\left(|P_i| + \sum_{n\in P_i}\left|\sum_{m=0,m\ne n}^{N-1} W_{i,n,m}S_{i,m} + \sum_{m=0}^{N-1} V_{i,n,m}S_{i-1,m}\right|^2 + |P_i|\sigma_z^2 - |P_i|\right)}{|P_i|}$$

$$= \frac{1}{|P_i|^2}\sum_{n\in P_i}\left|\sum_{m=0,m\ne n}^{N-1} W_{i,n,m}S_{i,m} + \sum_{m=0}^{N-1} V_{i,n,m}S_{i-1,m}\right|^2 + \sigma_z^2$$

In the above, the first term expressed the ISI and ICI power, and the second term expresses the noise power. This equation is for the case in which the power of the pilot signal is normalized to 1 and the power mean of the frequency response is normalized to 1. That is, this equation is for the case in which the following Equation (11) is satisfied.

$$\sum_{n\in P_i}|W_{i,n,n}S_{i,n}|^2 = |P_i| \qquad(11)$$

In the case in which the power of the pilot signal is not 1, a commensurate adjustment coefficient can be introduced. The normalization of the frequency response is attributed to the amplitude adjustment when analog-to-digital conversion is done at the receiving unit b102.

The reconstruction unit b108 calculates the bit-log likelihood ratio from the modulation symbol $S'_{i,n}$ of the Equation (6). The equivalent amplitude gain is used in this calculation. Specifically, in the case of QPSK, with respect to the equivalent amplitude gain $\mu_{i,n}$ for the n-th subcarrier, expressed by the following Equation (12), the bit-log likelihood ratio $\lambda$ is expressed by the following Equations (13) and (14). In this case, Equations (13) and (14) are the bit-log likelihood ratios $\lambda(b_{i,n,0})$ and $\lambda(b_{i,n,1})$ for the first bit $b_{i,n,0}$ and the second bit $b_{i,n,1}$, respectively.

$$\mu_{i,n} = \frac{W^*_{i,n,n}W_{i,n,n}}{W^*_{i,n,n}W_{i,n,n} + \sigma_z^2 + \sigma_I^2} \qquad(12)$$

$$\lambda(b_{i,n,0}) = \frac{4\text{Re}[S'_{i,n}]}{\sqrt{2}(1-\mu_{i,n})} \qquad(13)$$

$$\lambda(b_{i,n,1}) = \frac{4\text{Im}[S'_{i,n}]}{\sqrt{2}(1-\mu_{i,n})} \qquad(14)$$

Next, the operating principle of the iterative processing will be described.

The symbol replica generation unit b110 calculates the expected value of the bit-log likelihood ratio decoded by the decoding unit b109 and modulates the calculated expected value to generate the symbol replica $S''_{i,n}$. The symbol replica $S''_{i,n}$ is frequency-to-time transformed by the IFFT unit b111, a GI being inserted at the GI insertion unit b112. The transmitted signal replica $s''_{i,k}$ output by the GI insertion unit b112 is expressed by the following Equation (15).

$$s''_{i,k} = \frac{1}{\sqrt{N}} \sum_{n=0}^{N-1} S''_{i,n} \exp\left[j\frac{2\pi n}{N}(k - N_g)\right] \quad (15)$$

In this case, in order to generate the transmitted signal replica $s''_{i,k}$ of Equation (15), the IFFT unit b111 performs an inverse fast Fourier transform, and the order of the number of multiplications in that transformation is $O(N \log_2 N)$.

The propagation channel estimation unit b106, based on the transmitted signal replica expressed by Equation (15) and the received signal input from the receiving unit b102, estimates the channel impulse response $h_{i,d,k}$. The propagation channel estimation unit b106 also takes the time average of the channel impulse response $h_{i,d,k}$ and performs a time-to-frequency transformation, calculating the frequency response $W_{i,n,n'}$.

The filter unit b113, based on the channel impulse response $h_{i,d,k}$ and the transmitted signal replica $s''_{i,k}$ expressed by Equation (15), generates the received signal replica $r''_{i,k}$ expressed the following Equation (16).

$$r''_{i,k} = \sum_{d=0}^{D} h_{i,d,k} s''_{i,k-d} \quad (16)$$

In order to generate the received signal replica of Equation (16), the order of the number of multiplications in the processing performed by the filter unit b113 is $O(DN)$. In this case, because generally $D \ll N$, this can be thought of as being $O(N)$.

The subtraction unit b103 subtracts the received signal replica $r''_{i,k}$ expressed by Equation (16) from the received signal $r_{i,k}$ expressed by Equation (1), and outputs the signal $r'_{i,k}$ expressed by the following Equation (17).

$$r'_{i,k} = r_{i,k} - r''_{i,k} \quad (17)$$

$$= \sum_{d=0}^{D} h_{i,d,k}(s_{i,k-d} - s''_{i,k-d}) + z_{i,k}$$

From the estimated channel impulse response, the extended FFT duration extraction unit b104 determines the signal selection duration to be output to the FFT unit b105.

[Case in which the Maximum Delay Time does not Exceed the Guard Interval Length]

First, processing when the maximum delay time does not exceed the length of the guard interval ($D \leq N_g$) will be described. In this case, similar to the first-time processing, the FFT duration of the previous wave is determined to be taken as the signal processing duration. With respect to the signal of that signal processing duration, the signal $R'_{i,n}$, which has been time-to-frequency transformed by the FFT unit b105 is expressed by the following Equations (18) and (19).

$$R'_{i,n} = \frac{1}{\sqrt{N}} \sum_{k=N_g}^{N_g+N-1} r'_{i,k} \exp\left[-j\frac{2\pi n}{N}(k - N_g)\right] \quad (18)$$

$$= W_{i,n,n}(S_{i,n} - S''_{i,n}) + \sum_{m=0, m \neq n}^{N-1} W_{i,n,m}(S_{i,m} - S''_{i,m}) + Z_{i,n}$$

$$W_{i,n,m} = \frac{1}{N} \sum_{d=0}^{D} \sum_{k=N_g}^{N_g+N-1} h_{i,d,k} \exp\left[-j\frac{2\pi(n-m)}{N}(k - N_g)\right] \exp\left(-j\frac{2\pi n}{N}d\right) \quad (19)$$

If the maximum delay time does not exceed the length of the guard interval, it is possible to suppress the interference to the extent that there is no ISI and ICI that are attributed to the previous symbol. In this case, in order to generate the signal $R'_{i,n}$, in Equation (18), the FFT unit b105 performs a fast Fourier transform, and the order of the number of multiplications in that transformation is $O(N \log_2 N)$.

The reconstruction unit b107 multiplies the symbol replica $S''_{i,n}$ by the frequency response $W_{i,n,n}$ and generates the replica signal $W_{i,n,n} S''_{i,n}$ of the desired signal that is influenced by the propagation channel. At the reconstruction unit b107, the generated replica signal $W_{i,n,n} S''_{i,n}$ is added to the signal $R'_{i,n}$ expressed by Equation (18). The signal $Y_{i,n}$, after this addition is expressed by the following Equation (20).

$$Y_{i,n} = R'_{i,n} + W_{i,n,n} S''_{i,n} \quad (20)$$

$$= W_{i,n,n} S_{i,n} + \sum_{m=0, m \neq n}^{N-1} W_{i,n,m}(S_{i,m} - S''_{i,m}) + Z_{i,n}$$

This Equation (20) means the signal in which the desired signal of the n-th subcarrier remains and is a signal from which the ICI is removed. By the removal of the ICI, it is possible to improve the signal-to-interference-plus-noise power ratio (SINR), and to improve the transmission performance.

Because the reconstruction unit b107 performs processing for generation of the signal $Y_{i,n}$ of Equation (20) for each subcarrier, the order of the number of multiplications in this processing is $O(N)$. If MMSE criterion filtering is, for example, used, the demodulator b108 performs demodulation by calculating the demodulation symbol $S'_{i,n}$ of the n-th subcarrier expressed by the following Equation (21) from the signal $Y_{i,n}$ expressed by Equation (20).

$$S'_{i,n} = \frac{W^*_{i,n,n}}{W^*_{i,n,n} W_{i,n,n} + \sum_{m=0, m \neq n}^{N-1} (E[|S_{i,m}|^2] - |S''_{i,m}|^2) W^*_{i,n,m} W_{i,n,m} + \sigma_z^2} Y_{i,n} \quad (21)$$

Although Equation (21) is the equation for the case in which the removal residue by the received signal is accurately considered, the present invention is not restricted to this, and the demodulation symbol $S'_{i,n}$ may be calculated using the following Equation (22) after converting the removal residue into the noise.

$$S'_{i,n} = \frac{W^*_{i,n,n}}{W^*_{i,n,n} W_{i,n,n} + \sigma_z^2 + \sigma_{I'}^2} Y_{i,n} \quad (22)$$

In the above, $\sigma_{I'}^2$ is the power of the ICI removal residue, which is calculated together with the noise power by the same method as in the first-time processing. The amount of deterioration of characteristics is small even if Equation (22) is used. In Equation (21), a number of multiplications having an order of $O(N^2)$ is required for calculation of the ICI removal residue term of the second term in the denominator. However, by using Equation (22), processing is possible with an order of the number of multiplications being $O(N)$, and it is possible to greatly reduce the number of multiplications. Thus, the order of the maximum number of multiplications in each part of the iterative processing is $O(N \log_2 N)$, and the receiving device b1 can perform iterative processing by processing having a number of multiplications with an order of $O(N \log_2 N)$.

[Case in Which the Maximum Delay Time Exceeds the Guard Interval Length]

Next, processing when the maximum delay time exceeds the length of the guard interval will be described. In this case, regardless of what FFT duration is taken, a signal other than the desired OFDM symbol will be captured. For this reason, with the expectation that interference can be sufficiently reduced by replica subtraction, the SINR and transmission performance are improved by, for example, the receiving device b1 extending the FFT duration beyond the usual duration and setting a position different from the usual position. For example, if the region from the leading edge of the pervious wave to the trailing edge of the maximum delay path is taken as the extended FFT duration, the signal $R'_{i,n}$ after which the FFT unit b105 performs a time-to-frequency transformation is expressed by the following Equations (23) and (24).

$$R'_{i,n} = \frac{1}{\sqrt{N}} \sum_{k=0}^{N_g+N+D-1} r'_{i,k} \exp\left[-j\frac{2\pi n}{N}(k-N_g)\right] \quad (23)$$

$$= \frac{1}{\sqrt{N}} \sum_{k=0}^{N-1} r'_{i,k} \exp\left[-j\frac{2\pi n}{N}(k-N_g)\right] +$$

$$\frac{1}{\sqrt{N}} \sum_{k=0}^{N_g+D-1} r'_{i,k+N} \exp\left[-j\frac{2\pi n}{N}(k-N_g)\right]$$

$$= \frac{1}{\sqrt{N}} \sum_{k=0}^{N_g+D-1} (r'_{i,k} + r'_{i,k+N}) \exp\left[-j\frac{2\pi n}{N}(k-N_g)\right] +$$

$$\frac{1}{\sqrt{N}} \sum_{k=N_g+D}^{N-1} r'_{i,k} \exp\left[-j\frac{2\pi n}{N}(k-N_g)\right]$$

$$= W_{i,n,n}(S_{i,n} - S''_{i,n}) + \sum_{m=0, m \neq n}^{N-1} W_{i,n,m}(S_{i,m} - S''_{i,m}) +$$

$$\sum_{m=0}^{N-1} V_{i,n,m,1}(S_{i-1,m} - S''_{i-1,m}) + \sum_{m=0}^{N-1} V_{i,n,m,2} (S_{i+1,m} - S''_{i+1,m}) + Z_{i,n}$$

$$W_{i,n,m} = \quad (24)$$

$$\frac{1}{N} \sum_{d=0}^{D} \sum_{k=d}^{N_g+N+d-1} h_{i,d,k} \exp\left[-j\frac{2\pi (n-m)}{N}(k-N_g)\right] \exp\left(-j\frac{2\pi n}{N}d\right)$$

In the above, $V_{i,n,m,1}$ and $V_{i,n,m,2}$ are ISI coefficients, the former being the coefficient from the immediately previous symbol, and the latter being the coefficient from the immediately subsequent symbol. From the third line of Equation (23), it can be understood that, in this processing, an FFT can be performed with respect to the signal $r'_{i,k}+r'_{i,k+N}$ at the discrete times $k=0$ to $N_g+D-1$, and the signal $r'_{i,k}$ at the discrete times $k=N_g+D$ to $N-1$.

The extended FFT duration extraction unit b104 outputs to the FFT unit b105 the signal $r'_{i,k}+r'_{i,k+N}$ at the discrete times $k=0$ to $N_g+D-1$, and the signal $r'_{i,k}$ at the discrete times $k=N_g+D$ to $N-1$. By doing this, even if the receiving device b1 synthesizes the FFT duration that is longer than the usual FFT duration, it is possible to reconstruct the signal with one FFT processing, as is in the conventional art.

The reconstruction unit b107 multiplies the symbol replica $S''_{i,n}$ by the frequency response $W_{i,n,n}$ and generates a replica signal $W_{i,n,n} S''_{i,n}$ of the desired signal that is influenced by the propagation channel. The reconstruction unit b107 adds the generated replica signal $W_{i,n,n} S''_{i,n}$ to the signal that is expressed by Equation (23). After this addition, the signal $Y_{i,n}$ is expressed by the following Equation (25).

$$Y_{i,n} = R'_{i,n} + W_{i,n,n} S''_{i,n} \quad (25)$$
$$= W_{i,n,n} S_{i,n} + Z'_{i,n} + Z_{i,n}$$

$$Z'_{i,n} = \sum_{m=0, m \neq n}^{N-1} W_{i,n,m}(S_{i,m} - S''_{i,m}) + \quad (26)$$

$$\sum_{m=0}^{N-1} V_{i,n,m,1}(S_{i-1,m} - S''_{i-1,m}) + \sum_{m=0}^{N-1} V_{i,n,m,2}(S_{i+1,m} - S''_{i+1,m})$$

This Equation (25) means that a signal in which the desired signal of the n-th subcarrier remains and that a signal from which the ISI and ICI are removed. By the removal of the ISI and ICI, it is possible for the receiving device b1 to improve the SINR, and to improve the transmission performance. That is, it is possible to achieve good receiving performance.

Similar to the cases of the first-time processing and when the delay time does not exceed the guard interval, the demodulator b108 performs demodulation by calculating the demodulation symbol $S'_{i,n}$ of the n-th subcarrier that is expressed by the following Equation (27) from the signal $Y_{i,n}$ that is expressed by Equation (25).

$$S'_{i,n} = \frac{W^*_{i,n,n}}{W^*_{i,n,n} W_{i,n,n} + \sigma_z^2 + \sigma_{I'}^2} Y_{i,n} \quad (27)$$

In the above, $\sigma_{I'}^2$ is the power of the ISI and ICI removal residue, and is calculated together with the noise power, similar to the first-time processing.

The decoding unit b109 performs decoding processing with respect to the bit-log likelihood ratios $\lambda(b_{i,n,0})$ and $\lambda(b_{i,n,1})$ of the demodulation symbol $S'_{i,n}$ expressed by Equation (27). After that, iterative processing is repeated. By repeating the above-described iterative processing, it is possible to greatly improve the transmission performance.

<Operation of the Receiving Device b1>

Figure 5:
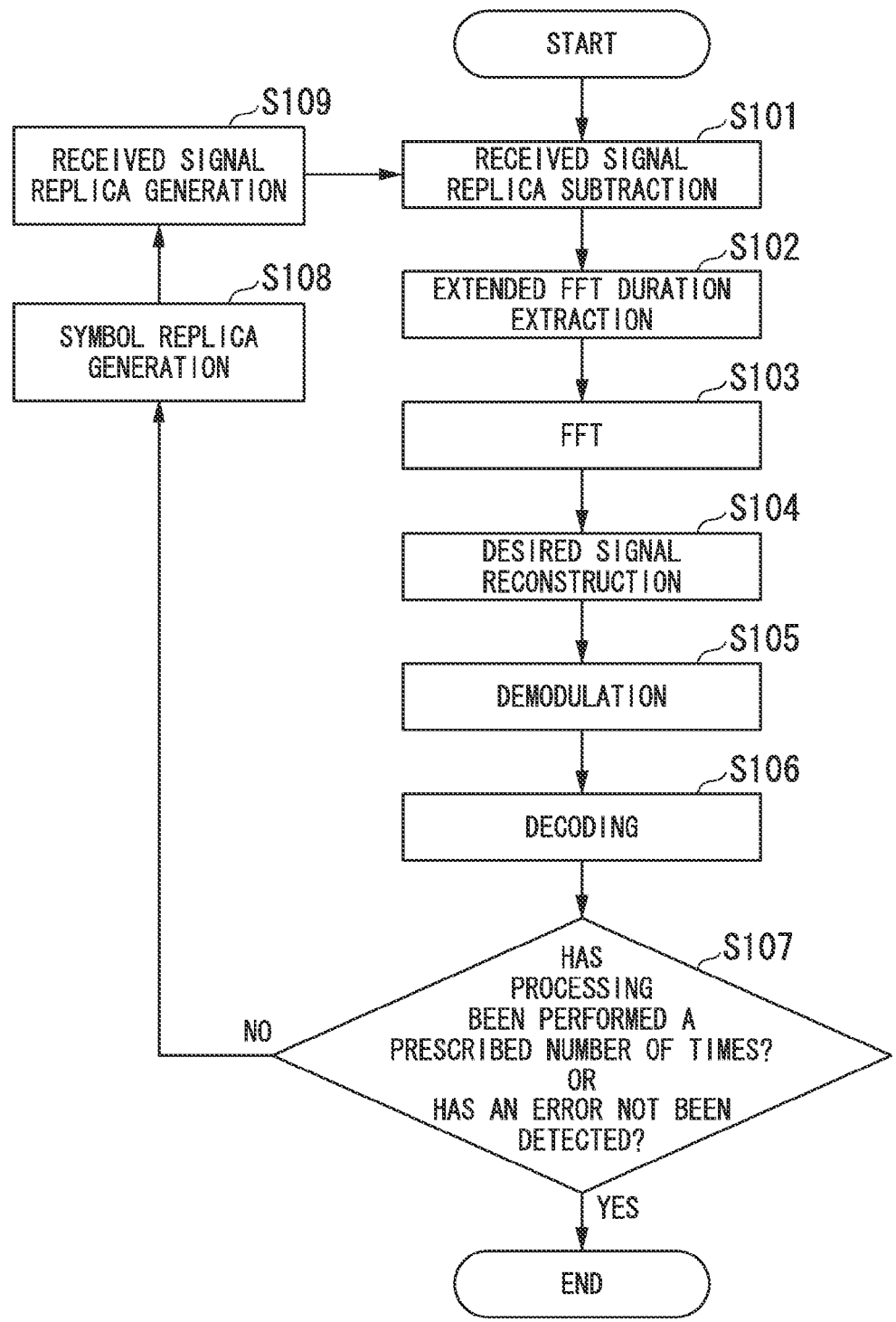
FIG. 5 is a flowchart showing the operation of the receiving device according to the present embodiment.

FIG. 5 is a flowchart that shows the operation of the receiving device according to the present embodiment. The operation shown in this drawing is the processing after the receiving unit b102 of FIG. 2 outputs the first-time received signal to the subtraction unit b103.

(Step S101) The subtraction unit b103 subtracts the received signal replica generated at step S109, which is described later, from the received signal. After that, processing proceeds to step S102.

(Step S102) The extended FFT duration extraction unit b104, of the signal resulting from the subtraction at step S101, extracts an FFT duration so that interference is made small. After that, processing proceeds to step S103.

(Step S103) The FFT unit b105 performs time-to-frequency transformation with respect to the signal of the FFT duration extracted at step S102. After that, processing proceeds to step S104).

(Step S104) The reconstruction unit b107, for each subcarrier, adds to the symbol replica generated at step S108, to be described below, a symbol replica signal that is multiplied by the frequency response of the signal in the FFT duration extracted by the extended FFT duration extraction unit b104 with respect to the signal resulting from the transformation at step S103. After that, processing proceeds to step S105.

(Step S105) The demodulator unit b108 performs propagation channel compensation and calculates the bit-log likelihood ratio with respect to the signal resulting from the addition at step S104. After that, processing proceeds to step S106.

(Step S106) The decoding unit b109 performs decoding processing, such as error correction, with respect the bit-log likelihood ratio resulting from the calculation at step S105. After that, processing proceeds to step S107.

(Step S107) The decoding unit b109 determines whether an error has not been detected in the decoding results from step S106 or whether processing has been performed a prescribed number of times. In either case (Yes), the receiving device b1 stops operation. However, if neither of these conditions has occurred (No), processing proceeds to step S108. The determination of whether an error has occurred in the decoding results may be performed, for example, at the MAC (media access control) layer.

(Step S108) The symbol replica generation unit b110 generates a symbol replica from the bit-log likelihood ratio of the decoding results at step S106. After that, processing proceeds to step S109.

(Step S109) The IFFT unit b111, the GI insertion unit b112, and the filter unit b113 generate a received signal replica, based on the symbol replica generated at step S108. After that, processing proceeds to step S101.

In this manner, according to the present embodiment, the propagation channel estimation unit b106 estimates the propagation channel estimation value. The symbol replica generation unit b110 generates a symbol replica that is a modulation symbol of the demodulated information. The signal extraction unit B1, based on the propagation channel estimation value and the symbol replica, extracts each subcarrier component of the received signal, from which interference has been removed, in time durations of arbitrary length. The demodulator b108 demodulates the signals of each subcarrier component of the received signal, based on the signal of the time durations extracted by the signal extraction unit B1. By doing this, the receiving device b1 can achieve good receiving performance, while suppressing an increase in the amount of calculation and circuit scale.

Also, according to the present embodiment, the receiving device b1 extracts each subcarrier component of the received signal, from which ISI and ICI have been removed, and demodulates the signal of each of the extracted subcarrier components. By doing this, the receiving device b1 can prevent an increase in the amount of calculation. Not only in the case in which the delay time of the delayed wave exceeds the guard interval, it is possible as well to suppress the ICI that is generated by high-speed movement of the receiving device.

In the above-noted first embodiment, the description has been of the case in which the filter unit b113 generates a received signal replica, the subtraction unit b103 subtracts this received signal replica, and the reconstruction unit b107 adds the replica signal of the desired signal to perform demodulation processing for each subcarrier. However, if the maximum delay time does not exceed the guard interval, the present invention is not restricted in this manner, and demodulation processing for each subcarrier may be performed by the filter unit b113 generating a signal replica of the received signal from which the desired received signal has been removed, and the subtracting unit b103 subtracting this replica signal.

In this case, the above-noted Equation (17) is replaced by the following Equations (28) and (29).

$$r'_{i,k} = r_{i,k} - \sum_{d=0}^{D} h'_{i,d,k} s''_{k-d} \tag{28}$$

$$h'_{i,d,k} = h_{i,d,k} - \frac{1}{N} \sum_{k=N_g}^{N+N_g-1} h_{i,d,k} \tag{29}$$

Although in the above-noted first embodiment the duration extracted by the extended FFT duration extraction unit b104 is from the leading edge of the previous wave to the trailing edge of the maximum delay path, this is not a restriction. For example, this may be extraction from the leading edge to the trailing edge of the path having the highest power. Also, the position shown in FIG. 6 can be the starting position or the ending position of the duration.

Figure 6:
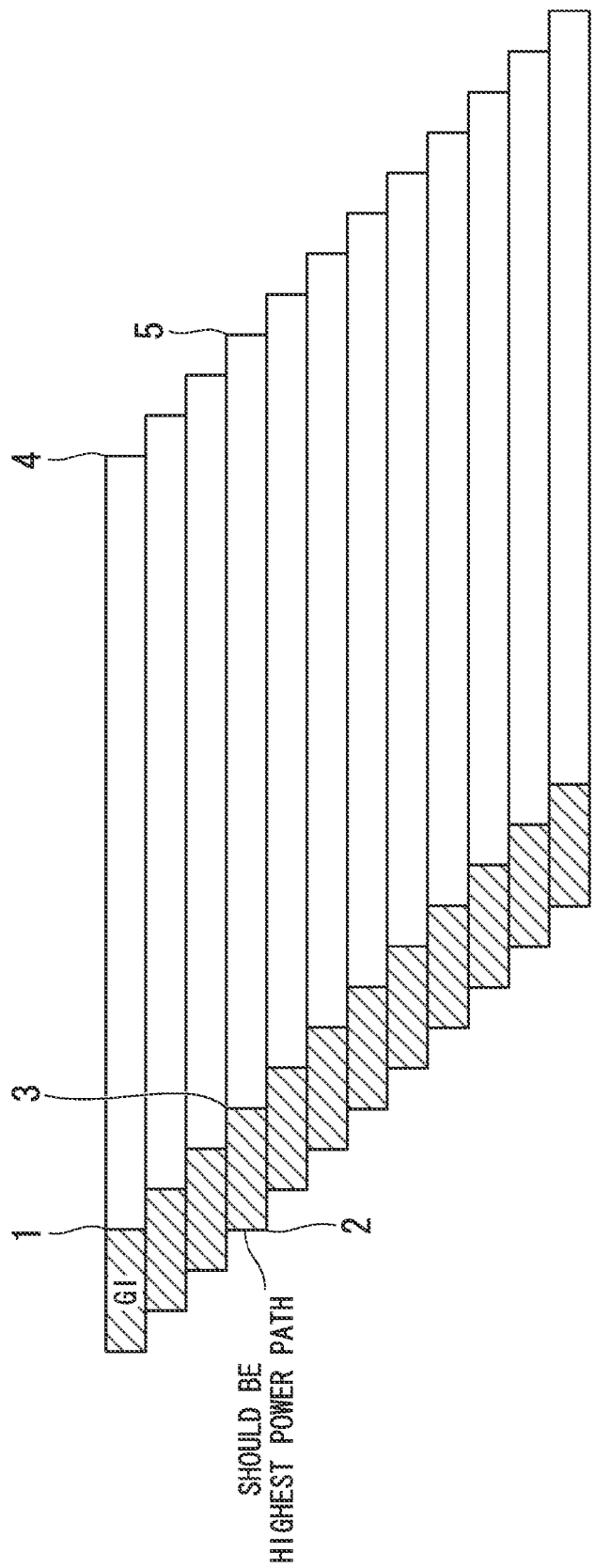
FIG. 6 is a simplified drawing showing an example of an FFT duration selected by the receiving device according to a variation example of the present embodiment.

FIG. 6 is a simplified drawing showing an example of FFT durations selected by the receiving device according to a variation example of the present embodiment. In this drawing, the horizontal axis is the time axis, and the vertical axis is the path.

For example, the extended FFT duration extraction unit b104 may make the starting position of the extended FFT duration the leading edge of the previous wave, from which the guard interval has been removed (the time shown by the reference symbol 1). Also, the extended FFT duration extraction unit b104 may, for example, search from the previous wave and make the starting position of the extended FFT duration the leading edge of the path having the highest power (the fourth path in FIG. 6). Also, the extended FFT duration extraction unit b104 may search, for example, from the previous wave and make the starting position of the extended FFT duration the leading edge of the previous wave, from which the guard interval has been removed (the time shown by the reference symbol 3).

The extended FFT duration extraction unit b104 may also, for example, make the ending position of the extended FFT duration the position most rearmost position at which there is no leakage from the immediately previous OFDM symbol (the time shown by the reference symbol 4). The extended FFT duration extraction unit b104 may also, for example, search from the previous wave and make the ending position of the extended FFT duration the rearmost position at which there is no leakage from the immediately previous OFDM symbol (the time shown by the reference symbol 5), with regard to paths after the path having the highest power. The extended FFT duration extraction unit b104 may also select either the leading edge or the trailing edge of a previously established path, in place of the leading edge or rearmost position of the path having the highest power. In this manner, the duration extracted by the extended FFT duration extraction unit b104 according to the present invention is not restricted to the above-noted scope and, in the sense of the FFT duration length being different than usual, may be applied also to any length. Additionally, it need not be at a breakpoint in the guard interval or a signal.

Although in the above-noted first embodiment the description was for the case in which the communications system performs multicarrier signal communication, the present invention is not restricted to this, and can be applied to single-carrier signal communication performed using FFT.

(Second Embodiment)

The second embodiment of the present invention will be described in detail, with references made to the drawings. In the first embodiment, in order for the receiving device b1 to perform an FFT on a duration that is longer than usual, the extended FFT duration extraction unit b104 selects the target extended FFT duration as the signal processing duration. The description has been for the case in which the signal of the signal processing duration selected by the receiving device b1 is demodulated for each subcarrier and information bits are decoded. In the present embodiment, the description is for the case in which the receiving device multiplies by a window function before extracting a signal of an extended FFT duration, and uses a plurality of subcarriers to demodulate and decode the signal.

Because the transmitting device according to the present embodiment is the same as the transmitting device a1 of the first embodiment, its description will be omitted. In the following, the receiving device will be referred to as the receiving device b2.

Figure 7:
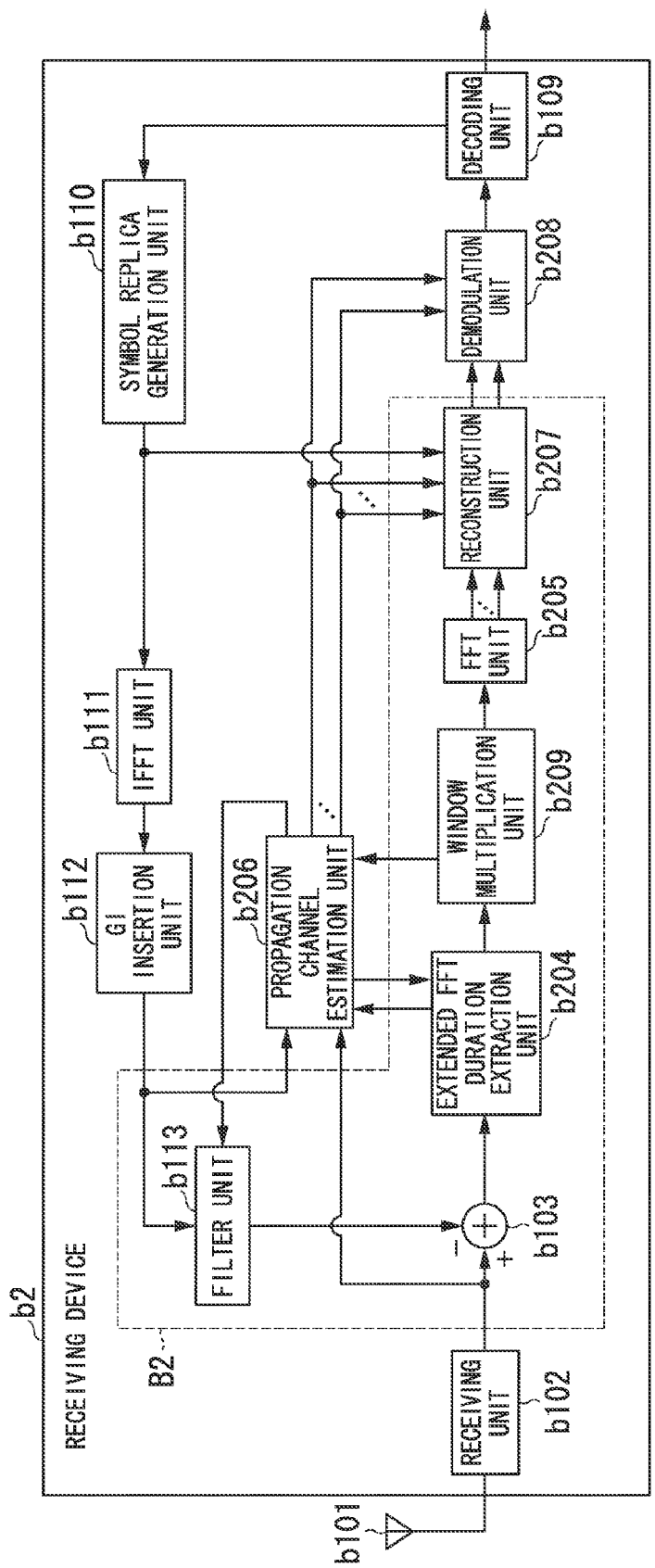
FIG. 7 is a simplified block diagram showing the constitution of a receiving device according to a second embodiment of the present invention.

FIG. 7 is a simplified block diagram showing the constitution of the receiving device b2 according to the second embodiment of the present invention. Comparing the receiving device b2 (FIG. 7) of the present embodiment with the receiving device b1 (FIG. 2) of the first embodiment, an extended FFT duration extraction unit b204, an FFT unit b205, a propagation channel estimation unit b206, and a reconstruction unit b207 of the signal extraction unit B2 differ, a window multiplication unit b209 is added, and also a demodulator b208 is different. However, the functions of the other constituent elements (the receiving antenna b101, the receiving unit b102, the subtraction unit b103, the decoding unit b109, the symbol replica generation unit b110, the IFFT unit b111, the GI insertion unit b112, and the filter unit b113) are the same as in the first embodiment. The descriptions of functions that are the same as in the first embodiment will be omitted.

The extended FFT duration extraction unit b204, based on the channel impulse response estimation value input from the propagation channel estimation unit b206, which will be described later, extracts and outputs a signal of an FFT duration to the window multiplication unit b209.

The extended FFT duration extraction unit b204 outputs information indicating the extracted signal processing duration to the propagation channel estimation unit b209.

The window multiplication unit b209 multiplies the output results of the extended FFT duration extraction unit by a window function, and outputs the result to the FFT unit b205. By multiplication by a window function in this manner, the receiving device b2 can reduce the effect of the ISI and ICI removal residue. In this case, the window function that is used can be, for example, a Hanning window. This processing will be described together with the operating principle.

The window multiplication unit b209 outputs the information of the multiplied window to the propagation channel estimation unit b206.

The FFT unit b205 performs time-to-frequency transformation of the time-domain signal input from window multiplication unit b209, and outputs the transformed frequency-domain signal to the reconstruction unit b207. When this is done, not only is the same subcarrier output with respect to one desired subcarrier, but neighboring subcarriers are output as well. The FFT unit b205 differs in this respect from the FFT unit b105 (refer to FIG. 2) of the first embodiment.

The propagation channel estimation unit b206 estimates the channel impulse response in the same manner as in the first embodiment, and outputs it to the filter unit b113 and the extended FFT duration extraction unit b204. The propagation channel estimation unit b206, with respect to the estimated channel impulse response, performs time-to-frequency transformation corresponding to a signal processing duration indicated by information input from the extended FFT duration extraction unit b204 and window function information indicated by information input from the window multiplication unit, and outputs the desired subcarrier frequency response and ICI coefficient into a neighboring subcarrier. In this respect, the propagation channel estimation unit b206 differs from the propagation channel estimation unit b106 (refer to FIG. 2) of the first embodiment.

The propagation channel estimation unit b206, using a pilot signal stored beforehand, measures the noise power and the interference power in the pilot subcarrier.

For each subcarrier to be processed, the reconstruction unit b207 multiplies the symbol replica input from the symbol replica generation unit b110 by the frequency response input from the propagation channel estimation unit b206, and the ICI coefficients into the neighboring subcarrier, and generates a replica signal of the desired signal that is influenced by the propagation channel for only the desired and the neighboring subcarriers. The reconstruction unit b207 adds the generated replica signal to the desired and neighboring subcarrier signals input from the FFT unit b205. That is, the reconstruction unit b207, based on the propagation channel estimation value and the symbol replica, generates a replica signal of the desired signal, adding the replica signal of the desired signal to the frequency-domain signal transformed by the FFT unit b205, and extracting each subcarrier component of the received signal.

The reconstruction unit b207 outputs to the demodulator b208 the signal to which the replica signal has been added.

The reconstruction unit b208 uses the frequency response input from the propagation channel estimation unit b206, the ICI coefficient, the noise power, and the interference power to calculate filter coefficients using a ZF criterion or an MMSE criterion. The reconstruction unit b208 uses the calculated filter coefficients to perform propagation channel compensation. The reconstruction unit b208, based on mapping information notified beforehand from the transmitting device a1, performs demapping of the signal which is propagation channel compensated, and performs reconstruction processing of the demapped signal. The reconstruction unit b208 outputs the bit-log likelihood ratio result of the reconstruction processing to the decoding unit b109.

<Operating Principle>

With respect to the signal $r'_{i,k}$ that is output by the subtraction unit b103, the extended FFT duration extraction unit b204 extracts a signal processing duration and, after multiplication by the window function in the window multiplication unit b209, the FFT unit b205 performs an FFT. Therefore, the signal $R'_{i,n}$ output by the FFT unit b205 is as shown by the following Equation (30).

$$R'_{i,n} = \frac{1}{\sqrt{N}} \sum_{k=0}^{N_g+N+D-1} p(k)r'_{i,k}\exp\left[-j\frac{2\pi n}{N}(k-N_g)\right] \quad (30)$$

$$= \frac{1}{\sqrt{N}} \sum_{k=0}^{N_g+D-1} [p(k)r'_{i,k} + p(k+N)r'_{i,k+N}]\exp$$

$$\left[-j\frac{2\pi n}{N}(k-N_g)\right] + \frac{1}{\sqrt{N}} \sum_{k=N_g+D}^{N-1} p(k)r'_{i,k}\exp$$

$$\left[-j\frac{2\pi n}{N}(k-N_g)\right]$$

$$= W_{i,n,n}(S_{i,n} - S''_{i,n}) + \sum_{m=0, m \neq n}^{N-1} W_{i,n,m}(S_{i,m} - S''_{i,m}) +$$

$$\sum_{m=0}^{N-1} V_{i,n,m,1}(S_{i,m} - S''_{i,m}) + \sum_{m=0}^{N-1} V_{i,n,m,1}$$

$$(S_{i,m} - S''_{i,m}) + Z_{i,n}$$

$$W_{i,n,m} = \frac{1}{N} \sum_{d=0}^{D} \sum_{k=d}^{N_g+N+d-1} p(k) h_{i,d,k} \exp\left[-j\frac{2\pi(n-m)}{N}(k-N_g)\right] \exp\left(-j\frac{2\pi n}{N}d\right) \quad (31)$$

In this case, p(k) is the window function. By using a Hanning window or the like in the receiving device b2, it is possible to reduce the influence of the ISI and ICI the farther removed is the subcarrier. In the case of the Hanning window in particular, although there is a great reduction of the ICI to a subcarrier removed by two or more subcarriers, the power of the desired carrier is reduced, and a large amount of ICI to an immediately neighboring subcarrier remains. Given this, in the receiving device b2 demodulation is performed using neighboring subcarriers as well. That is, the signal that is output from the FFT unit b205 and that is to demodulate the n-th subcarrier is $R'_{i,n+1}$ (l=0, 1, −1, 2, −2, . . . , L, −L). As described above, if a Hanning window is used, a sufficient effect is achieved with L=1.

The reconstruction unit b207 multiplies the symbol replica $S''_{i,n+1}$ by the frequency response (ICI coefficient) $W_{i,n+1,n}$ to generate the (n+1)th replica signal $W_{i,n+1,n}S''_{i,n}S''_{i,n}$. The reconstruction unit b207 adds to the signal $R'_{n+l}$ expressed by Equation (30) the generated (n+1)th replica signal $W_{i,n+1,n}S''_{i,n}S''_{i,n}$. The signal $X_{i,n,1}$ after the addition is expressed by the following Equation (32).

$$X_{i,n,l} = R'_{i,n+l} + W_{i,n+l,n}S''_{i,n} \quad (32)$$

$$= W_{i,n+l,n}S_{i,n} + \sum_{m=0,m\neq n}^{N-1} W_{i,n+l,m}(S_{i,m} - S''_{i,m}) + Z_{i,n+l}$$

The demodulator b208 calculates the n-th subcarrier demodulation symbol $S'_{i,n}$ by the following Equation (33), which is the equation for the case of a noise approximation of the removal residue.

$$S'_{i,n} = \frac{\sum_{l=-L}^{L} W^*_{i,n+l,n} X_{i,n,l}}{\sum_{L=-L}^{L} W^*_{i,n+l,n} W_{i,n+l,n} + \sigma_z^2 + \sigma_{l'}^2} \quad (33)$$

In each subcarrier, the power of signals leaking from other subcarriers is reduced, the greater is the difference in frequency. By multiplying by a window function, this trend becomes prominent. Therefore, in the receiving device b2, L may be established beforehand and made, for example, L=±1. Also, as noted above, in the receiving device b2, information regarding L subcarriers separated from the n-th subcarrier by on the high or low frequency side is used in processing. The present invention is not restricted to this, however, and processing may be done using a number of subcarriers that differs in direction of frequency value, and may be done using only frequencies on the high side or low side.

<Operating of the Receiving Device b2>

Figure 8:
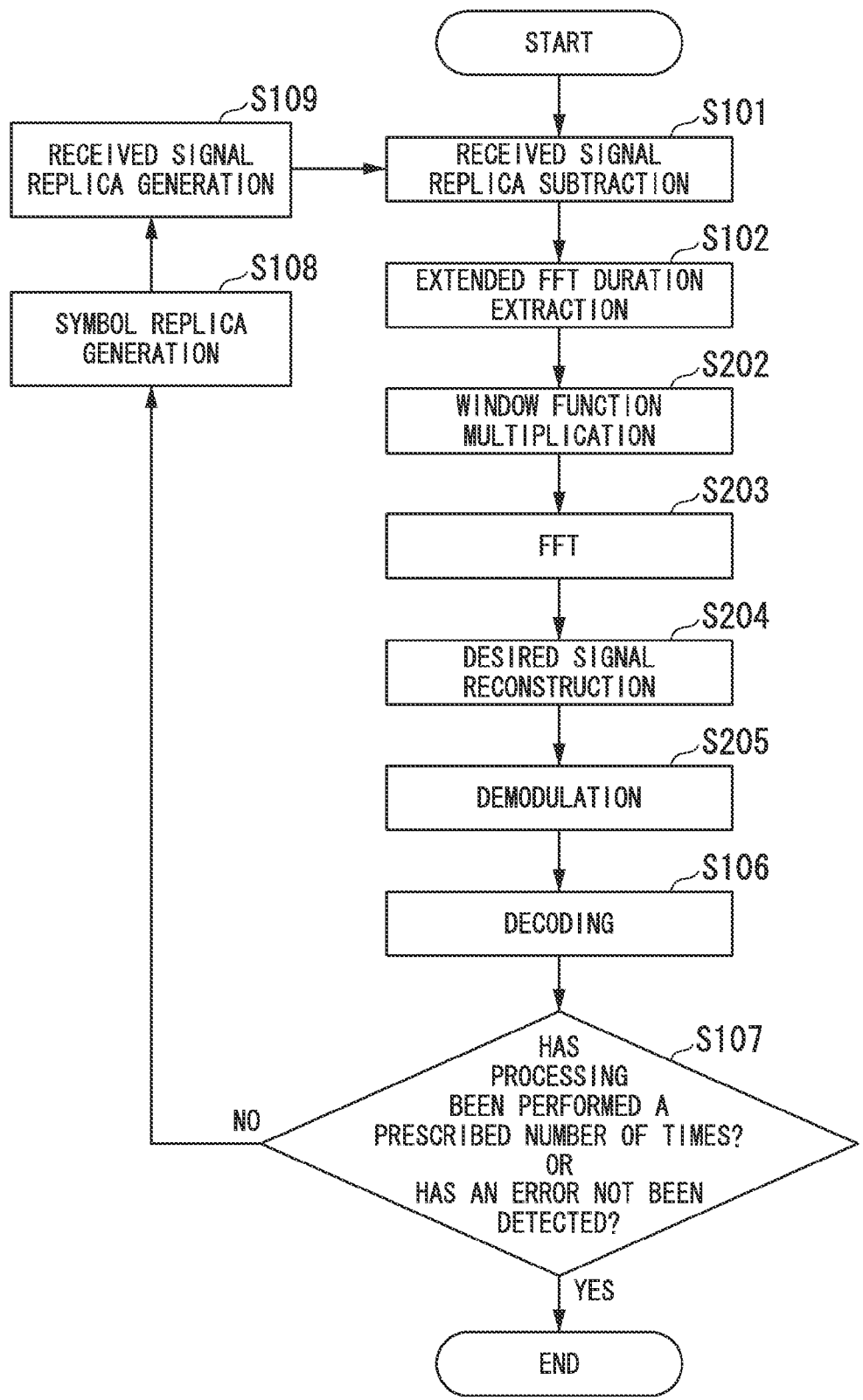
FIG. 8 is a flowchart showing the operation of the receiving device according to the present embodiment.

FIG. 8 is a flowchart that shows the operation of the receiving device b2 according to the present embodiment. The operation shown in this drawing is the processing after the receiving unit b102 of FIG. 7 outputs the first-time received signal to the subtraction unit b103.

If the operation (FIG. 8) of the receiving device b2 of the present embodiment is compared with the operation (FIG. 5) of the receiving device b1 of the first embodiment, steps S202 to S205 are different. The other processing (the processing of steps S101 to S102, S106 to S109), however, is the same as in the first embodiment. The description of processing that is the same as in the first embodiment will be omitted.

(Step S202) The window multiplication unit b209 multiplies the signal of the FFT duration extracted at step S102 by a window function. After that, processing proceeds to step S203.

(Step S203) The FFT unit b205 performs time-to-frequency transformation of the signal resulting from the window multiplication at step S202. With respect to a given subcarrier processing unit, that subcarrier and neighboring subcarriers are used. After that, processing proceeds to step S204.

(Step S204) The reconstruction unit b207, for each subcarrier, adds to the signal of the (n+1)th subcarrier resulting from the transformation at step S203 the (n+1)th replica signal in which the symbol replica generated at step S107 is multiplied by the ICI coefficient. After that, processing proceeds to step S205.

(Step S205) The demodulator b208, performs propagation channel compensation with respect to the signal resulting from the addition at step S204 and calculates the bit-log likelihood ratio. After that, processing proceeds to step S106.

In this manner, according to the present embodiment, the receiving device b2 can, by multiplying by a window function, reduce the influence of ICI, the farther removed is a subcarrier from the desired subcarrier. Also, with respect to a signal of a subcarrier component, a subcarrier component of a replica signal of the desired signal, and which is a subcarrier in proximity to the subcarrier is added. By doing this, the receiving device b2 can further improve the SINR, and achieve good transmission performance.

The window function may be a rectangle, that is, so that nothing need be multiplied. In this case, although there is no ICI-reduction effect for a distanced subcarrier, there is no reduction of power in a subcarrier that is the same with the desired subcarrier. It is possible in this case as well to achieve the SINR-improvement effect of using nearby subcarriers.

(Third Embodiment)

The third embodiment of the present invention will be described below, with references made to the drawings. In the present embodiment, the communication system performs MIMO (multiple-input multiple-output) transmission communication.

The present embodiment is the case in which a receiving device b3 having R antennas receives a signal transmitted by a transmitting device a3 having T antennas. In this case, the receiving device b3 receives, using R antennas T, streams transmitted from the transmitting device a3 via the T antennas, so as to perform MIMO separation.

<Constitution of the Transmitting Device a3>

Figure 9:
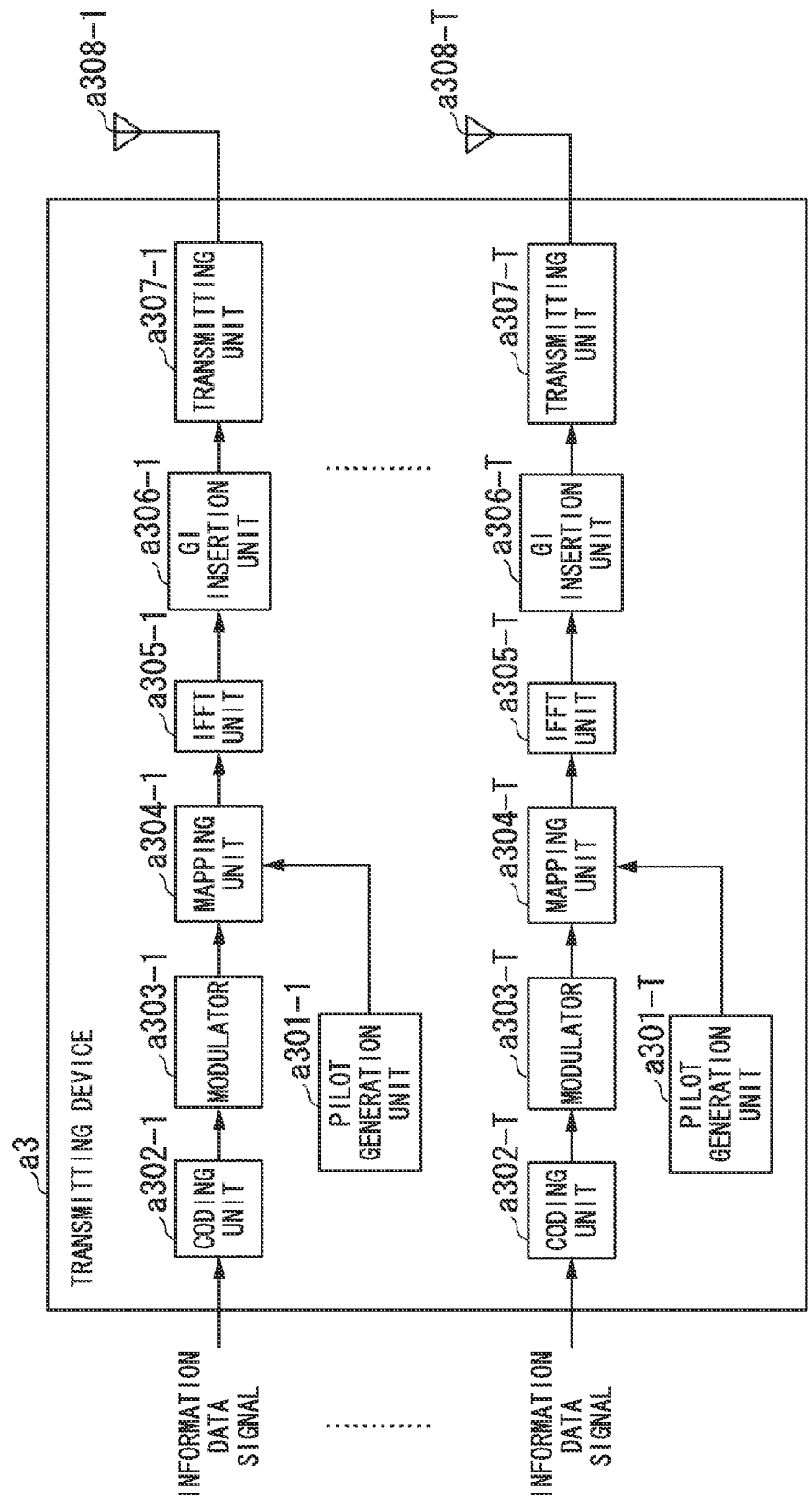
FIG. 9 is a simplified block diagram showing the constitution of a transmitting device according to a third embodiment of the present invention.

FIG. 9 is a simplified block diagram that shows the constitution of the transmitting device a3 according to the first embodiment of the present invention. In this drawing, the transmitting device a3 is constituted so as to include a pilot generation unit a301-t (t=1, 2, . . . T; the same will apply hereinafter), a coding unit a302-t, a modulator a303-t, a mapping unit a304-t, an IFFT unit a305-t, a GI insertion unit a306-t, a transmitting unit a307-t, and a transmitting antenna a308-t.

The pilot generation unit a301-t generates a pilot signal, the amplitude value of the waveform (or signal stream) of which is stored by the receiving device b3 beforehand, and outputs it to the mapping unit a304-t.

The coding unit a302-t codes the information bits to be transmitted to the receiving device b3, using an error correction code such as convolution code, a turbo code, or an LDPC code, and generates coded bits. The coding unit a302-t outputs the generated coded bits to the modulator a303-t.

The modulator a303-t modulates the coded bits input from the coding unit a302-t, using a modulation scheme such as PSK or QAM, and generates modulation symbols. The modulator a303-t outputs the generated modulation symbols to the mapping unit a304-t.

The mapping unit a304-t maps the pilot signal input from the pilot generation unit a301-t and the modulation symbols input from the modulator a303-t onto resources, based on pre-established mapping information, generates a frequency-domain signal, and outputs the generated frequency-domain signal to the IFFT unit a305-t. The mapping information is decided by the transmitting device a3, and notified beforehand by the transmitting device a3 to the receiving device b3.

The IFFT unit a305-t performs a frequency-to-time transformation of the frequency-domain signal input from the mapping unit a304-t to generate a time-domain signal. The IFFT unit a305-t outputs the generated time-domain signal to the GI insertion unit a306-t.

The GI insertion unit a306-t adds a guard interval to the time-domain signal input from the IFFT unit a305-t, for each signal of an FFT duration. In this case, the guard interval is a known signal that uses a cyclic prefix or zero padding in which a zero duration is padded, which is copy of a part of the rear of the signal of an FFT duration, or a Golay code or the like. The GI insertion unit a306-t adds a signal such as this to the front of the signal of the FFT duration.

The GI insertion a306-t outputs a signal to which has been added with the guard interval to transmitting unit a307-t.

Also, the guard interval may be inserted at the rear of the FFT duration. In the case of using a cyclic prefix, for example, a partial copy of the front of the FFT duration is added to the rear of the signal of the FFT duration. In the case of the cyclic prefix, as long as the periodicity of the OFDM symbol duration is maintained, there is no restriction to the above.

The transmitting unit a307-t performs a digital-to-analog conversion of the signal input from the GI insertion unit a306-t, and wave-shapes the converted analog signal. The transmitting unit a307-t up-converts the wave-shaped signal from the baseband to the wireless frequency band, and transmits it from a transmitting antenna 308-t to the receiving device b3.

<Constitution of the Receiving Device b3>

Figure 10:
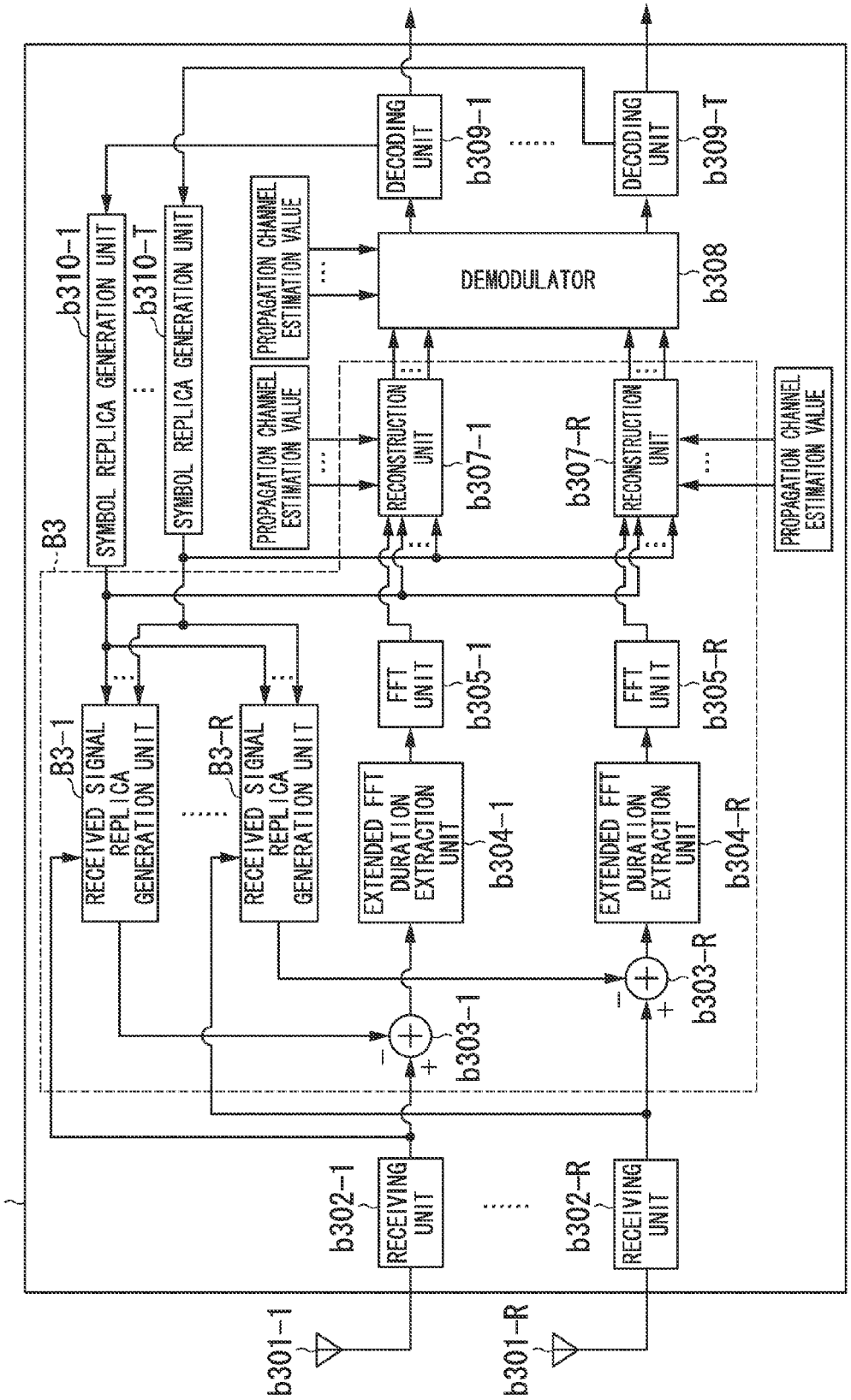
FIG. 10 is a simplified block diagram showing the constitution of a receiving device according to the present embodiment.

FIG. 10 is a simplified block diagram showing the constitution of the receiving device b3 according to the present embodiment. In this drawing, the receiving device b3 is constituted so as to include receiving antennas b301-r (r=1, 2, ... R; the same will apply hereinafter), receiving units b302-r, subtraction units b303-r, extended FFT duration extraction units b304-r, FFT units b305-r, receiving signal replica generation units B3-r, reconstruction units b307-r, a demodulator b308, decoding units b309-t, and symbol replica generation units b310-t. The subtraction units b303-1 to b303-R, the extended FFT duration extraction units b304-1 to b304-R, the FFT units b305-1 to b305-R, the reconstruction units b307-1 to b307-R, and the receiving signal replica generation units B3-1 to B3-R (and filter units b313-t to b313-R, which are described later) are referred to as the signal extraction unit B3.

The receiving units b302-r receive the transmitted signal transmitted by the transmitting device a3 via the receiving antennas b301-r. The receiving units b302-r perform frequency conversion and analog-to-digital conversion of the received signal and store the converted received signal. At the first-time processing and at the timing of input of the received signal replica to the subtraction units b303-r by totalizing unit b314-r, which will be described later, the receiving units b302-r output the received signal to be stored to the subtraction units b303-r and to the receiving signal replica generation units B3-r.

The subtraction units b303-r subtract from the received signal input from the receiving units b302-r the received signal replica input from the receiving signal replica generation units B3-r, which will be described later. The subtraction units b303-r output the signals from which the received signal replica has been subtracted to the extended FFT duration extracting units b304-r.

Also, in the case of the first-time processing, there is no (that is, zero) input to the subtraction units b303-r from the receiving signal replica generation units B3-r, and the subtraction units b303-r outputs to the extended FFT duration extraction units b304-r the received signal input from the receiving units b302-r as is.

The extended FFT duration extraction units b304-r, based on the channel impulse response input from the propagation channel estimation unit b306, which will be described later, output a signal of a signal processing duration such that the amount of interference is small to the FFT units b305-r. Information indicating the signal processing duration of the extracted signal is output to the propagation channel estimation unit b306. Details of the processing will be described later, together with the operating principle.

The FFT unit b305-r performs time-to-frequency transformation of the time-domain signal input from the extended FFT duration extraction unit b304-r, and outputs the transformed frequency-domain signal to the reconstruction unit b307-r.

The receiving signal replica generation unit B3-r estimates the frequency response from each of the antennas a308-t (referred to as the t-th antenna) of the transmitting device a3 corresponding to the antenna b301-r (referred to as the r-th antenna) and outputs it to the reconstruction unit b307-r and the demodulator b308. The receiving signal replica generation unit B3-r calculates the noise power and the ISI and ICI powers to output the demodulator 309b.

The receiving signal replica generation unit B3-r generates from a symbol replica input from the symbol replica generation unit b310-t a received signal replica that has been received by the r-th antenna and outputs it to the subtraction unit b303-r. Details of the constitution and processing of the receiving signal replica generation unit B3-r will be described later.

For each subcarrier, the reconstruction unit b307-r multiplies the frequency response input from the propagation channel estimation unit b306 by the symbol replica input from the symbol replica generation unit b310-t, which will be described later, so as to generate a replica signal of the desired signal that is influenced by the propagation channel. The reconstruction unit b307-r, for each subcarrier, adds the generated replica signal to the signal input from the FFT unit b305-r. That is, the reconstruction unit b307-r generates a replica signal of the desired signal, based on the propagation channel estimation value and the symbol replica, adds the replica signal of that desired signal to the frequency-domain signal that has been transformed by the FFT unit b305-r, and extracts each subcarrier signal component of the received signal. The reconstruction unit b307-r outputs to the demodulator b308 the signal to which the replica signal is added.

Also, in the case of the first-time processing, there is no (that is, zero) input to the reconstruction unit b307-r from the symbol replica generation unit b310-t, and the reconstruction unit b307-r outputs to the demodulator b308 the received signal input from the FFT unit b305-r as is.

The demodulator b308 calculates filter coefficients, based on the ZF criterion and the MMSE criterion or the like, using the frequency response, the noise power, and the interference power, which have been input from the propagation channel estimation unit b306. The demodulator b308 performs compensation, using the calculated filter coefficients. The demodulator b308 de-maps the signal that has been propagation channel compensated, based on mapping information that is previously notified from the transmitting device a1, and performs demodulation processing of the de-mapped signal. The demodulator b308 outputs the bit-log likelihood ratio of the result of the demodulation, regarding a signal of the transmitted signal stream (referred to as the t-th stream) that has been transmitted from the t-th antenna, to the decoding unit b309-t.

The decoding unit b309-t performs decoding processing of the demodulated symbols input from the demodulator b308 using, for example, maximum likelihood decoding, maximum a posteriori probability, log-MAP, Max-log-MAP, or SOVA.

As the result of the decoding processing, if the determination is made that an error is not detected, or that processing has been performed a prescribed number of times, the decoding unit b309-t outputs the bit-log likelihood ratio of the result of decoding as information data bits. However, if the determination is made that an error is detected and also that the processing has not been performed the prescribed number of times, the decoding unit b309-t outputs the bit-log likelihood ratio of the result of decoding to the symbol replica generation unit b310-t.

The symbol replica generation unit b310-t calculates the expected value of the bit-log likelihood ratio input from the decoding unit b309-t, modulates the calculated expected value and generates a symbol replica. The symbol replica generation unit b310-t maps the generated symbol replica based on the mapping information that was notified from the transmitting device a3 beforehand. The symbol replica generation units b310-t output the mapped symbol replica to the reconstruction units b307-1 to 307-t and the receiving signal replica generation units B3-1 to B3-R.

Figure 11:
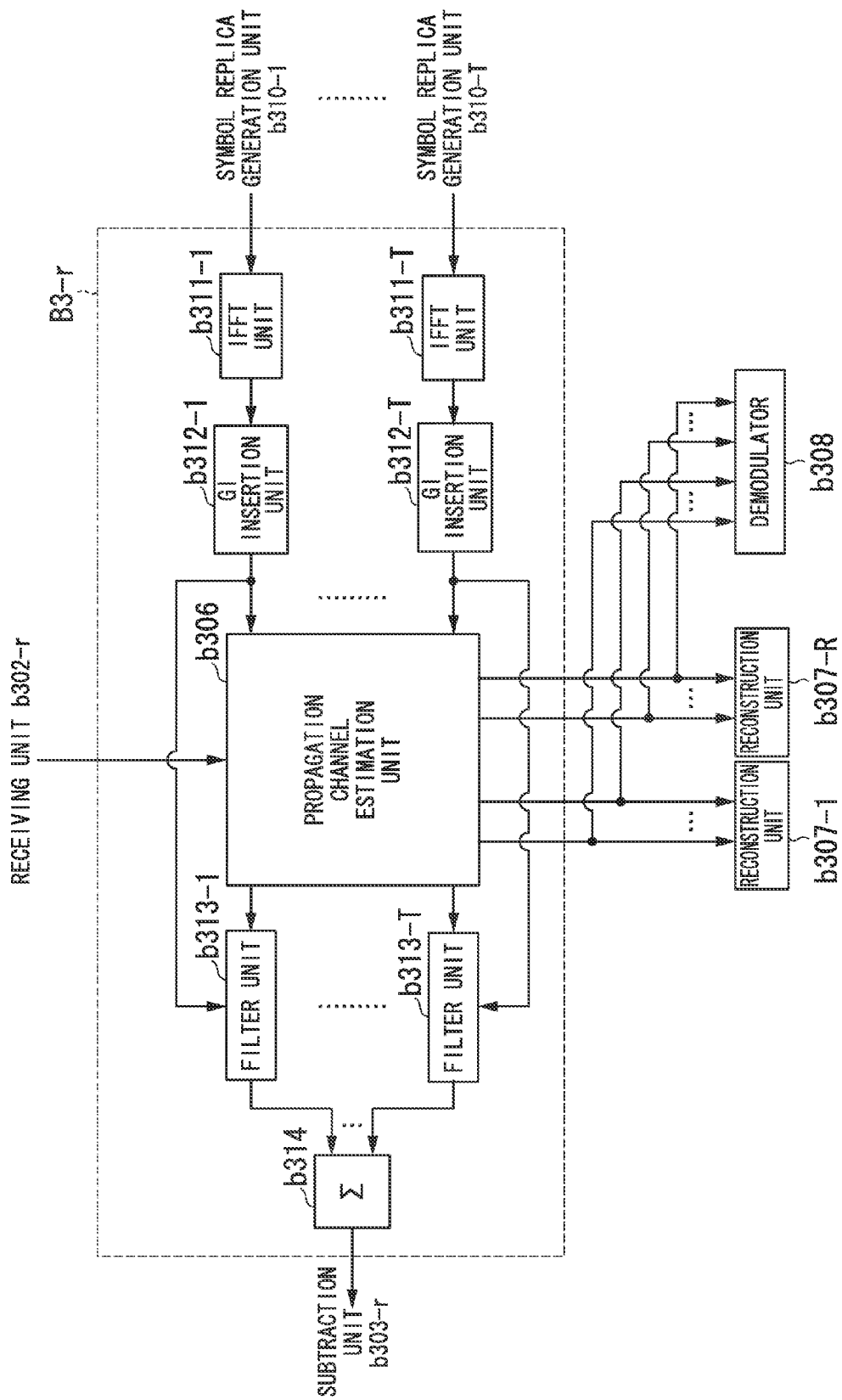
FIG. 11 is a simplified block diagram showing the constitution of a received signal replica generation unit according to the present embodiment.

FIG. 11 is a simplified block diagram that shows the construction of the receiving signal replica generation unit B3-r according to the present embodiment. In this drawing, the receiving signal replica generation unit B3-r is constituted so as to include IFFT units b311-t, GI insertion units b312-t, filter units b313-t, and a totalizing unit b314.

The IFFT unit b311-t performs frequency-to-time transformation of the symbol replica input from the symbol replica generation unit b310-t, and outputs the transformed time-domain replica signal to the GI insertion unit b312-t.

The GI insertion unit b312-t, for each signal in the FFT duration, adds a guard interval to the replica signal input from the IFFT unit b311-t, and generates the transmitted signal replica. The GI insertion unit b312-t outputs the generated transmitted signal replica to the propagation channel estimation unit b306 and the filter unit b313-t.

The propagation channel estimation unit b306, based on the received signal input from the receiving unit b302-r and the transmitted signal replica signal input from the GI insertion unit b312-t, estimates the channel impulse response of the propagation pass from the t-th antenna to the r-th antenna in the OFDM symbol duration. In the case of the first-time processing, there is no (that is, zero) input from the GI insertion unit b312-t to the propagation channel estimation unit b306, and the propagation channel estimation unit b306 estimates the channel impulse response that varies with time in the OFDM symbol duration, based on the previously stored pilot signal, and the received signal input from the receiving unit b302-r.

The propagation channel estimation unit b306 outputs the estimated channel impulse response to the filter unit b313-t and to the extended FFT duration extraction unit b304-t. The propagation channel estimation unit b306 also performs time-to-frequency transformation of the estimated channel impulse response that corresponds to the signal processing duration indicated by information input from the expanded FFT duration extraction unit b304-r, and estimates the frequency response. The propagation channel estimation unit b306 outputs the estimated frequency response to the reconstruction unit b307-r and the demodulator b308.

The propagation channel estimation unit b306 uses the previously stored pilot signal to measure the noise power and the interference power in the pilot subcarricr.

The filter unit b313-t generates the received signal replica of the t-th stream received by the r-th antenna, based on the channel impulse response input from the propagation channel estimation unit b306 and the transmitted signal replica input from the GI insertion unit b312-t. The filter unit b313-t outputs the generated received signal replica to the totalizing unit b314.

The totalizing unit b314 totals the received signal replica input from the filter unit b313-t and generates the received signal replica of received signal received by the r-th antenna. The totalizing unit b314 outputs the generated received signal replica to the subtraction unit b303-r.

<Operating Principle>

The operating principle of the receiving device b3 will be described below, with reference made to FIG. 10 and FIG. 10.

The received signal $r_{i,k}$ at a k-th discrete time of the i-th symbol received by the receiving unit b302-r is given by the following Equations (34) and (35).

$$r_{i,k,r} = \sum_{t=1}^{T} \sum_{d=0}^{D} h_{i,d,k,r,t} s_{i,k-d,t} + z_{i,k,r} \qquad (34)$$

$$s_{i,k,t} = \frac{1}{\sqrt{N}} \sum_{n=0}^{N-1} S_{i,n,t} \exp\left[j\frac{2\pi n}{N}(k - N_g)\right] \qquad (35)$$

In the above, T is the number of transmitting antennas a3 of the transmitting device a3, D is the maximum propagation channel number, $h_{i,d,k,r,t}$ is the complex amplitude at the k-th discrete time on the d-th path of the i-th symbol from the t-th antenna to the r-th antenna, $s_{i,k,t}$ is the time-domain transmitted signal of the i-th symbol of the t-th stream, and $z_{i,k,r}$ is the time-domain noise of the i-th symbol at the r-th antenna. Additionally, N is the number of points in an FFT duration, $S_{i,n,t}$ is the n-th subcarrier modulation signal of the i-th symbol of the t-th stream, $N_g$ is the number of points in the GI duration, and j is the unit of an imaginary number.

The subtraction unit b303-r subtracts the received signal replica from the received signal $r_{i,k,r}$ that is expressed by Equation (34). If the delay time of the delayed wave does not exceed the guard interval length, the extended FFT duration extraction unit b304-r extracts the FFT duration of the previous wave, and the FFT unit b305-r performs a time-to-frequency transformation on the output of the extended FFT duration extraction unit b304-r. The signal $R'_{i,n,r}$ output by the FFT unit b305-r is expressed by the following Equations (36) and (37).

$$R'_{i,n,r} = \sum_{t=1}^{T} \sum_{m=0}^{N-1} W_{i,n,m,r,t}(S_{i,m,t} - S''_{i,m,t}) + Z_{i,n,r} \tag{36}$$

$$W_{i,n,m,r,t} = \tag{37}$$

$$\frac{1}{N} \sum_{d=0}^{D} \sum_{k=N_g}^{N_g+N-1} h_{i,d,k,r,t} \exp\left[-j\frac{2\pi(n-m)}{N}(k-N_g)\right] \exp\left(-j\frac{2\pi n}{N}d\right)$$

In this case, $W_{i,n,m,r,t}$ is the leakage coefficient of a signal from the m-th subcarrier to the n-th subcarrier with regard to the i-th symbol of the t-th stream received by the r-th antenna, and the leakage coefficient $W_{i,n,n,r,t}$ for the case in which m=n is the frequency response. Additionally, $S''_{i,m,t}$ is the symbol replica for the signal of the m-th subcarrier of the t-th stream.

The reconstruction unit b307-r multiplies the symbol replica $S''_{i,n,t}$ by the frequency response $W_{i,n,n,r,t}$ input from the propagation channel estimation unit b306, and generates a replica signal $W_{i,n,n,r,t} S''_{i,n,t}$ of the desired signal with regard to the n-th subcarrier of the i-th symbol of t-th stream received by the r-th antenna, which is affected by the propagation channel. The reconstruction unit b307-r adds the generated replica signal $W_{i,n,n,r,t} S''_{i,n,t}$ to the signal $R'_{i,n,r}$ that is expressed by Equation (36). That is, the reconstruction unit b307-r extracts the subcarrier component of the frequency-domain signal transformed by the FFT unit b305-r, and adds to the signal of the extracted subcarrier component a desired stream component of the subcarrier component of a replica signal of the desired signal. The signal $Y_{i,n,r,t}$ after this addition is expressed by the following Equation (38).

$$Y_{i,n,r,t} = R'_{i,n,r} + W_{i,n,n,r,t} S''_{i,n,t} \tag{38}$$

$$= W_{i,n,n,r,t} S_{i,n,t} + \sum_{u=1}^{T} \sum_{m=0, m \neq n}^{N-1} W_{i,n,m,r,u}(S_{i,m,u} - S''_{i,m,u}) +$$

$$\sum_{u=0, u \neq t}^{T} W_{i,n,n,r,u}(S_{i,n,u} - S''_{i,n,u}) + Z_{i,n,r}$$

In this case, because the third term of Equation (38) indicates that the signal for another stream is removed, Equation (38) means that MIMO separation is done.

The demodulator b308, using the following Equation (39), calculates the demodulation symbol $S'_{i,n,t}$ of the n-th subcarrier of the t-th stream. However, Equation (39) is the equation for the case of noise approximation of the removal residue.

$$S'_{i,n,t} = \frac{\sum_{r=1}^{R} W^*_{i,n,n,r,t} Y_{i,n,r,t}}{\sum_{r=1}^{R} W^*_{i,n,n,r,t} W_{i,n,n,r,t} + \sigma_z^2 + \sigma_{I'}^2} \tag{39}$$

Next, the case in which the delay time of the delayed wave exceeds the guard interval length will be described. Similar to the first embodiment, this is the description of the case of synthesis from the leading edge of the previous wave to the trailing edge of the maximum delayed wave. The signal $R'_{i,n,r}$ output by the FFT unit b305-r is expressed by the following equations (40) and (41).

$$R'_{i,n,r} = \tag{40}$$

$$\sum_{t=1}^{T} \sum_{m=0}^{N-1} W_{i,n,m,r,t}(S_{i,m,t} - S''_{i,m,t}) + \sum_{t=1}^{T} \sum_{m=0}^{N-1} V_{i,n,m,r,t,1}(S_{i-1,m,t} - S''_{i-1,m,t}) +$$

$$\sum_{t=1}^{T} \sum_{m=0}^{N-1} V_{i,n,m,r,t,2}(S_{i+1,m,t} - S''_{i+1,m,t}) + Z_{i,n,r}$$

$$W_{i,n,m,r,t} = \tag{41}$$

$$\frac{1}{N} \sum_{d=0}^{D} \sum_{k=d}^{N_g+N+d-1} h_{i,d,k,r,t} \exp\left[-j\frac{2\pi(n-m)}{N}(k-N_g)\right] \exp\left(-j\frac{2\pi n}{N}d\right)$$

In the above, $V_{i,n,m,r,t,1}$ is the ISI coefficient from an immediately previous symbol in the t-th stream received by the r-th antenna. $V_{i,n,m,r,t,2}$ is the ISI coefficient from one immediately after.

The reconstruction unit b307-r multiplies the symbol replica $S''_{i,n,t}$ by the frequency response $W_{i,n,n,r,t}$ and generates the replica signal $W_{i,n,n,r,t} S''_{i,n,t}$ of the desired signal that is influenced by the propagation channel. The reconstruction unit b307-r adds the generated replica signal $W_{i,n,n,r,t} S''_{i,n,t}$ to the signal $R'_{i,n,r}$ expressed by Equation (40). The signal $Y_{i,n,r,t}$ after this addition is expressed by the following Equation (42).

$$Y_{i,n,r,t} = \tag{42}$$

$$R'_{i,n,r} + W_{i,n,n,r,t} S''_{i,n,t} = W_{i,n,n,r,t} S_{i,n,t} + \sum_{u=1, u \neq t}^{T} W_{i,n,n,r,u}(S_{i,n,u} - S''_{i,n,u}) +$$

$$\sum_{m=0, m \neq n}^{N-1} W_{i,n,m,r,t}(S_{i,m,t} - S''_{i,m,t}) + \sum_{m=0}^{N-1} V_{i,n,m,r,t,1}(S_{i-1,m,t} - S''_{i-1,m,t}) +$$

$$\sum_{m=0}^{N-1} V_{i,n,m,r,t,2}(S_{i+1,m,t} - S''_{i+1,m,t}) + Z_{i,n,r}$$

The demodulator b308 calculates the demodulation symbol $S'_{i,n,t}$ of the n-th subcarrier of the t-th stream by the following Equation (43). This equation is the case of a noise approximation of the removal residue.

$$S'_{i,n,t} = \sum_{r=1}^{R} \frac{W^*_{i,n,n,r,t} Y_{i,n,r,t}}{\sum_{r=1}^{R} W^*_{i,n,n,r,t} W_{i,n,n,r,t} + \sigma_z^2 + \sigma_{I'}^2} \tag{43}$$

<Operation of the Receiving Device b3>

Figure 12:
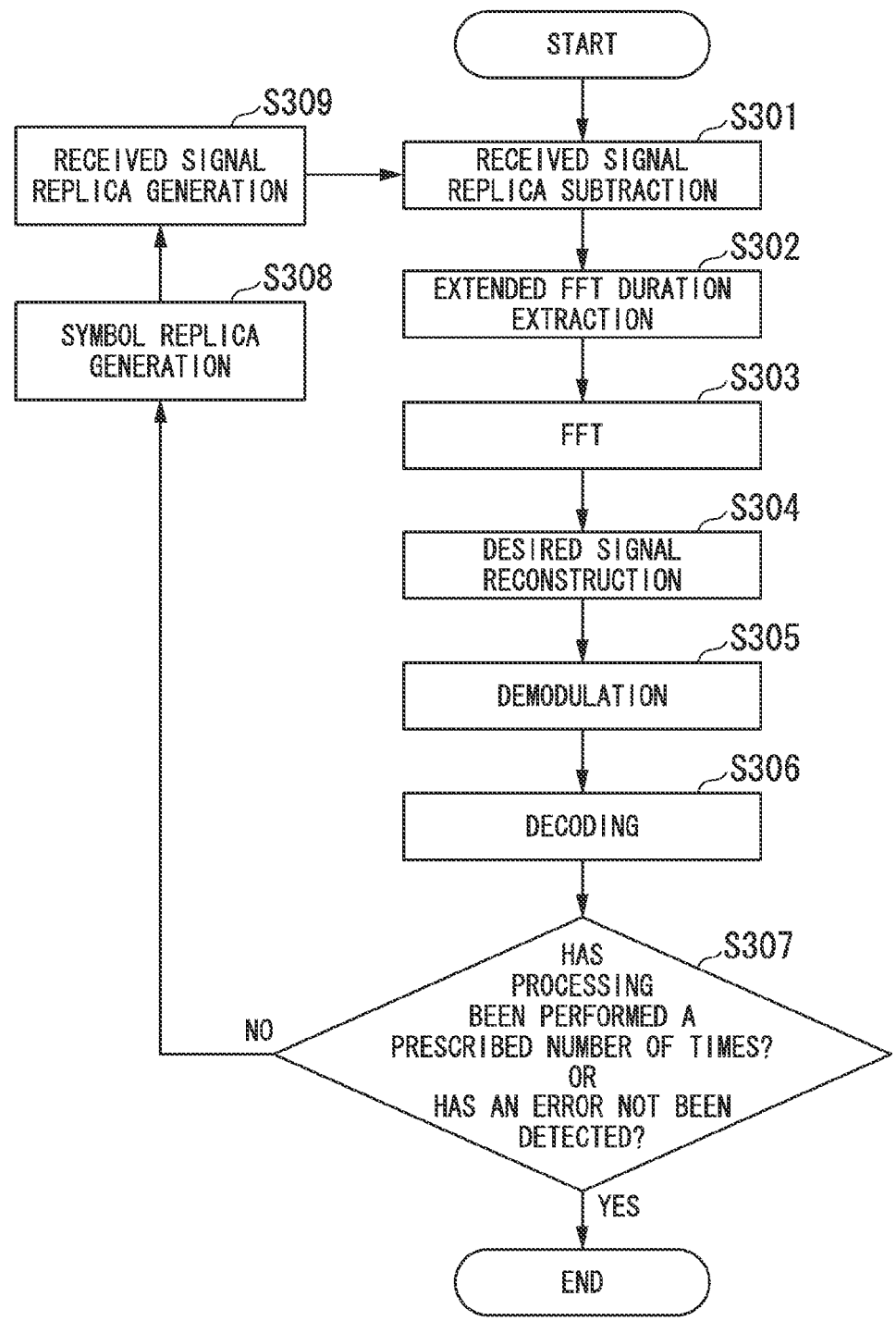
FIG. 12 is a flowchart showing the operation of the receiving device according to the present embodiment.

FIG. 12 is a flowchart showing the operation of the receiving device b3 according to the present embodiment. The operation shown in this drawing is the processing after the receiving unit b302-r of FIG. 11 outputs the first-time received signal to the subtraction unit b303-r.

(Step S301) The subtraction unit b303-r subtracts the received signal replica input at step S308, which will be described later, from the received signal. After that, processing proceeds to step S302.

(Step S302) The extended FFT duration extraction unit b305-r, of the signal resulting from the subtraction at step S301, extracts an FFT duration so that interference is made small. After that, processing proceeds to step S303.

(Step S303) The FFT unit b305-r performs time-to-frequency transformation of the signal of the FFT duration extracted at step S302. After that, processing proceeds to step S304.

(Step S304) The reconstruction unit b307, for each subcarrier, adds to the symbol replica generated at step S308, to be described below, a symbol replica signal that is multiplied by the frequency response of the signal in the FFT duration extracted by the extended FFT duration extraction unit b304-r with respect to the signal resulting from the transformation at step S303. After that, processing proceeds to step S305.

(Step S305) The demodulator b308-r performs propagation channel compensation with respect to the signal resulting from the transformation at step S103 with respect to the signal resulting from the addition at step S304. After that, the processing proceeds to step S306.

(Step S306) The decoding unit b309-t performs decoding processing, such as error correction, with respect to the bit-log likelihood ratio resulting from the calculation at step S305. After that, processing proceeds to step S307.

(Step 307) The decoding unit b309-t determines whether an error has not been detected in the decoding results from step S306 or whether processing has been performed a prescribed number of times. In either case (Yes), the receiving device b3 stops operation. However, if neither of these conditions has occurred (No), processing proceeds to step S308.

(Step S308) The symbol replica generation unit b310-t generates a symbol replica from the bit-log likelihood ratio of the decoding results at step S305. After that, processing proceeds to step S309

(Step S309) The received signal replication generation unit B3-r, based on the symbol replica generated at step S308, generates a received signal replica. After that, processing proceeds to step S301.

In this manner, according to the present embodiment, the receiving device b3 extracts each subcarrier component of a received signal from which ISI and ICI have been removed and demodulates the signal of each extracted subcarrier component. By doing this, even in the case of the MIMO transmission system, it is possible for the receiving device b3 to prevent an increase in the amount of calculation.

Although in the above-described third embodiment the receiving device b3, even in the case of the desired subcarrier, the signals of other streams are demodulated, these need not be demodulated. That is, the second terms in Equations (38) and (42) need not be demodulated. In this case, by the demodulator performing MIMO separation, it is possible to perform not only linear processing, for example, by ZF and MMSE, but also non-linear processing, such as maximum likelihood detection (hereinafter abbreviated MLD).

The principle of the calculation processing for bit-log likelihood ratio, which is performed by the receiving unit b3 using MLD, will be described below for the case of also reconstructing the signal of another stream.

The reconstruction unit b307 adds to the signal $R'_{i,n,r}$ expressed by Equation (40) the generated replica signal $W_{i,n,n,r,t}S''_{i,m,t}$ for all values of t. That is, the reconstruction unit b307-r extracts the subcarrier component of the frequency-domain signal transformed by the FFT unit b305-r, and adds to the signal of the extracted subcarrier component all the stream components of the subcarrier components of the replica signal of the desired signal. The signal $Y_{n,r,t}$ after this addition is expressed by the following Equations (44) and (45).

$$Y_{i,n,r} = R'_{i,n,r} + \sum_{t=1}^{T} W_{i,n,n,r,t,1} S''_{i,n,t} \tag{44}$$

$$= \sum_{t=1}^{T} W_{i,n,n,r,t} S_{i,n,t} + Z'_{i,n,r}$$

$$Z''_{i,n,r} = \sum_{t=1}^{T} \sum_{m=0, m \neq n}^{N-1} W_{i,n,m,r,t}(S_{i,m,t} - S''_{i,m,t}) + \tag{45}$$

$$\sum_{t=1}^{T} \sum_{m=0}^{N-1} V_{i,n,m,r,t,1}(S_{i-1,m,t} - S''_{i-1,m,t}) +$$

$$\sum_{t=1}^{T} \sum_{m=0}^{N-1} V_{i,n,m,r,t,2}(S_{i+1,m,t} - S''_{i+1,m,t}) + Z_{i,n,r}$$

In this case, if Equation (44) is expressed as a spectrum, this is expressed by the following Equations (46) to (49).

$$Y_{i,n} = (Y_{i,n,1} \ldots Y_{i,n,R})^T \tag{46}$$

$$= H_{i,n} S_{i,n} + Z_{i,n}$$

$$H_{i,n} = \begin{pmatrix} W_{i,n,n,1,1} & \cdots & W_{i,n,n,1,T} \\ \vdots & \ddots & \vdots \\ W_{i,n,n,R,1} & \cdots & W_{i,n,n,R,T} \end{pmatrix} \tag{47}$$

$$S_{i,n} = (S_{i,n,1} \ldots S_{i,n,T})^T \tag{48}$$

$$Z_{i,n} = (Z'_{i,n,1} \ldots Z'_{i,n,R}) \tag{49}$$

In the above, $^T$ indicates transposition of a matrix. In this case, the bit stream $\beta_{i,n}$ of the vector $S_{i,n}$ of Equation (49) is given by the following Equation (50).

$$\beta_{i,n} = \lfloor b_{i,n,1,0} \ldots b_{i,n,1,M-1} \ldots b_{i,n,T,M-1} \rfloor \tag{50}$$

In the above, M is a modulation multilevel number and, for example, for QPSK, M=2, and for 16QAM, M=4. Also, $b_{i,n,t,q}$ represents the q-th bit of the t-th stream making up the vector $s_{i,n}$. In the description to follow, the subscripts i and n that represent the i-th symbol and the n-th subcarrier will be omitted. That is, $\beta_{i,n}$ will be written as $\mu$, and $b_{i,n,t,q}$ will be written as $b_{t,q}$. The bit-log likelihood ratio $\lambda(b_{t,q})$ of the bit $b_{t,q}$ in Equation 50) is expressed by the following Equation (51).

$$\lambda(b_{t,q}) = \log \frac{p(b_{t,q} = 0 | Y_{i,n})}{p(b_{t,q} = 1 | Y_{i,n})} \tag{51}$$

$$= \log \frac{\sum_{\beta, b_{t,q}=0} p(\beta | Y_{i,n})}{\sum_{\beta, b_{t,q}=1} p(\beta | Y_{i,n})}$$

p(A|B) expresses the conditional probability of A in B.

$\Sigma_{\beta, b_{t,q}=0} p(\beta | Y_{i,n})$ is the expression of the sum of the cases in which $b_{t,q}$ only is 0 and other bits are 0 and 1.

In this case, using Bayes' Theorem, p(A|B) p(B)=p(B|A) p(A), the bit-log likelihood ratio $\lambda(b_{t,q})$ of Equation (51) is expressed by the following Equation (52).

$$\lambda(b_{t,q}) = \log \frac{\sum_{\beta, b_{t,q}=0} p(Y_{i,n} | \beta) p(\beta)}{\sum_{\beta, b_{t,q}=1} p(Y_{i,n} | \beta) p(\beta)} \tag{52}$$

Under the hypothesis that $Z'_{i,n,r}$ conforms to a Gaussian process, using the Max-log approximation, the bit-log likelihood ratio $\lambda(b_{t,q})$ of Equation (52) is expressed by the following Equation (53).

$$\lambda(b_{t,q}) = \max_{\beta, b_{t,q}=0}\left[\frac{1}{\sigma_{z'}^2}(-\|Y_{i,n} - H_{i,n}S_{i,n}\|^2) + \log p(\beta)\right] - \max_{\beta, b_{t,q}=1}\left[\frac{1}{\sigma_{z'}^2}(-\|Y_{i,n} - H_{i,n}S_{i,n}\|^2) + \log p(\beta)\right] \quad (53)$$

If each of the bits is assumed to be independent, the $p(\beta)$ in Equation (53) is expressed by the following Equation (54).

$$p(\beta) = \prod_{t',q',t'\neq t,q'\neq q} p(b_{t',q'}) \quad (54)$$

In this case, $p(b_{t',q'})$ can be calculated by the bit-log likelihood ratio $\lambda_a(b_{t',q'})$ output by the decoding unit b309-t'. Because the bit-log likelihood ratio $\lambda(b_{t,q})$ obtained in this manner is calculated using the bit-log likelihood ratio $\lambda_a(b_{t,q})$, that component is generally subtracted. That is, the value that the demodulator b308 outputs to the decoding unit b309-t is $\lambda(b_{t,q}) - \lambda_a(b_{t,q})$.

Because this is simple, the LLR may be calculated with the assumption that there is no prior information. In this case, the bit-log likelihood ratio $\lambda(b_{t,q})$ is expressed by the following Equation (55).

$$\lambda(b_{t,q}) = \max_{\beta, b_{t,q}=0}\left[\frac{1}{\sigma_{z'}^2}(-\|Y_{i,n} - H_{i,n}S_{i,n}\|^2)\right] - \max_{\beta, b_{t,q}=1}\left[\frac{1}{\sigma_{z'}^2}(-\|Y_{i,n} - H_{i,n}S_{i,n}\|^2)\right] \quad (55)$$

The demodulator b308, calculates the bit-log likelihood ratio $\lambda(b_{t,q})$ of the result of the demodulation processing using Equation (67), and outputs it to the decoding unit b309-t.

Also, although the above description is for MLD that calculates all candidates, the present invention can also be applied to a reduced-calculation type MLD, such as QRM-MLD or MLD that uses sphere decoding.

Although in the above-noted third embodiment the duration extracted by the extended FFT duration extraction unit b304-r is from the leading edge of the previous wave to the trailing edge of the maximum delay path, this is not a restriction. For example, extraction may be done from the leading edge to the trailing edge of the path with the highest power.

In the above-noted third embodiment as well, multiplication by a window function may be done, similar to the second embodiment.

In the above-described third embodiment, although the transmitting device a3 (FIG. 9) has one encoding unit a302-t with respect to one antenna a308-t, the present invention is not restricted to this, and one encoding unit may be provided for a plurality of antennas. For example, the transmitting device b3 may have one encoding unit, and the result of error correction encoding may be distributed and output among modulators a303-1 to a303-T, in accordance with a pre-established pattern.

In the above-noted third embodiment, the same information data signal stream transmitted signal may be included in the 1st to the T-th stream, and all different information data signal stream transmitted signals may be included therein. For example, in the case of transmitting two information data signal streams, the transmitting device a3 may transmit one information data signal stream as the 1st and 2nd streams and the other information data signal stream as the 3rd and 4th streams.

Also, in each of the above-noted embodiment, the receiving devices b1, b2, and b3 have been described as subtracting the received signal replica from the received signal in the time domain. However, the present invention is not restricted to this, and received signal replica may be subtracted from the received signal in the frequency domain. In this case, for example, at the receiving device b1, the receiving unit b102 outputs the received signal to the extended FFT duration extraction unit b104, and the filter unit b113 outputs the received signal replica to the extended FFT duration extraction unit b104. After the signal of the FFT duration indicating the extraction duration information is multiplied by the window, the extended FFT duration extraction unit b104 extracts it from the received signal input from the receiving unit b102 and the received signal replica input from the filter unit b113. The FFT unit b105 performs time-to-frequency transformation of each of the signals extracted by the extended FFT duration extraction unit b104. The reconstruction unit b107 subtracts the received signal replica from the received signal of the FFT duration on which the FFT unit b105 has performed a time-to-frequency transformation. The reconstruction unit b107 adds the replica signal, with the subtracted signal as the signal $R'_{i,n}$ of Equation (13) or Equation (23).

Alternatively, a computer may implement a part of the transmission devices a1, a3 and the reception devices b1 to b3 in the above-described embodiment, for example, the pilot generation units a101, a301-t, the coding units a102, a302-t, the modulators a103, a303-t, the mapping units a104, a304-t, the IFFT units a105, a305-t, the GI insertion units a106, a306-t, the transmitting units a107, a307-t, the receiving units b102, b302-r, the subtraction units b103, b303-r, the extended FFT duration extraction units, b104, b204, b304-r, the FFT units, b105, b205, b305-r, the propagation pass estimation units b106, b206, b306, the reconstruction units, b107, b207, b307-r, the demodulators b108, b208, b308, the decoding units b109, b309-t, the symbol replica generation units b110, b310-t , the IFFT units b111, b300-t, the GI insertion units b112, b3120t, the filter units b113, b313-t and the synthesis unit b314. In this case, a program for the purpose of implementing the control functions may be recorded on a computer-readable recording medium, and a computer system may read and execute the program recorded on the recording medium, thereby implementing the functions. The term "computer system" means a computer system that is incorporated into the transmitting devices a1, a3 or the receiving devices b1 to b3, including an operating system and also hardware, such as peripheral devices. The term "computer-readable recording medium" refers to a portable medium, such as a flexible disk, an optical-magnetic disc, a ROM, and a CD-ROM, and a storage device, such as a hard disk, that is built into a computer system. The term "computer-readable recording medium" may include a medium that dynamically retains a program for a short time, for example, a communication line when the program is transmitted via a network such as the Internet, a communication line such as a telephone line, as well as a medium to retain a program for a certain time, for example, a flash memory internally provided in a computer system acting as the server and client in that case. The program may have the object of implementing a part of the above-described function, and it may also implement the above-described function in combination with a program already stored in a computer system.

Alternatively, an implementation of part or all of the transmitting devices a1, a3 or the receiving devices b1 to b3 in the above-described embodiments may be done as an integrated circuit such as an LSI (large-scale integration) device. Each of the functional blocks of the transmitting devices a1, a3 or the receiving devices b1 to b3 may be implemented as an individual processor, or may be integrated by a part or all parts thereof and as processors. The method of implementation by circuit integration is not restricted to being an LSI but may also be by a dedicated circuit or by a general-purpose processor. In the case of the appearance of integrated circuit technology which supplants LSIs by advancements in semiconductor technology, it still possible to use an integrated circuit according to the present art.

Although the embodiments of the present invention are described in detail above with references made to the accompanying drawings, the specific configuration is not limited to the above, and various designs, changes and the like are possible as long as they are encompassed within the scope thereof, without departing from the spirit of the present invention.

INDUSTRIAL APPLICABILITY

The present invention is preferable for use in a communication device such as a receiving device.

REFERENCE SYMBOLS a1, a3: Transmitting device
b1, b2, b3: Receiving device
a101, a301-t : Pilot generation unit
a102, a302-t : Coding unit
a103, a303-t : Modulator
a104, a304-t : Mapping unit
a105, a305-t : IFFT unit
a106, a306-t : GI insertion unit
a107, a307-t : Transmitting unit
a108, a308-t : Transmitting antenna
a101, b301-r: Receiving antenna
b102, b302-r: Receiving unit
b103, b303-r: Subtraction unit
b104, b204, b304-r: Extended FFT duration extraction unit
b105, b205, b305-r: FFT unit
b106, b206, b306: Propagation channel estimation unit
b107, b207, b307-r: Reconstruction unit
b108, b208, b308: Demodulator
b109, b309-t : Decoding unit
b110, b310-t : Symbol replica generation unit
b111, b311-t : IFFT unit
b112, b312-t : GI insertion unit
b113, b313-t : Filter unit
b209: Window multiplication unit
b314: Synthesis unit
B1, B2: Signal extraction unit
B3-r: Receiving signal replica generation unit

The invention claimed is:

1. A receiving device comprising:
a signal extraction unit configured to extract a signal of an arbitrary time duration using a received signal and a received signal replica that is a replica of the received signal in the time domain obtained from a bit-log likelihood ratio obtained by receiving processing at least one time, and perform a time-to-frequency transform on the extracted signal so as to obtain each subcarrier signal of the received signal in which at least intercarrier interference is suppressed;
a propagation channel estimation unit configured to estimate a propagation channel so as to determine a propagation channel estimation value; and
a symbol replica generation unit configured to generate a symbol replica that is a replica of a modulated symbol from the bit-log likelihood ratio,
wherein the signal extraction unit comprises:
a filter unit configured to generate the received signal replica, based on the propagation channel estimation value and the symbol replica;
a subtraction unit configured to subtract the received signal replica from the received signal;
an extended Fast Fourier Transform (FFT) duration extraction unit configured to extract from the signal subtracted by the subtraction unit an extended FFT duration signal that is a signal of time duration of arbitrary length so as to generate an FFT signal from the extended FFT duration signal;
a time-to-frequency transformation unit configured to transform the FFT signal into a frequency-domain signal; and
a reconstruction unit configured to generate a subcarrier replica signal, based on the propagation channel estimation value and the symbol replica, and add the subcarrier replica signal to the frequency-domain signal transformed by the time-to-frequency transformation unit, so as to obtain each subcarrier signal of the received signal,
wherein each of said signal extraction unit, said propagation channel estimation unit, and said symbol replica generation unit comprise a circuit.

2. The receiving device according to claim 1, wherein the filter unit is configured to generate the received signal replica, based on a symbol replica on which a frequency-to-time transformation has been performed and the propagation channel estimation value.

3. The receiving device according to claim 1, wherein a duration length of the extended FFT duration signal is longer than that of an FFT duration signal.

4. The receiving device according to claim 3, wherein the FFT duration signal includes a signal longer than a duration length of the FFT duration signal of the extended FFT duration signal.

5. The receiving device according to claim 1, wherein a starting position of a time duration of the extended FFT duration signal is different from a starting time of an FFT duration signal.

6. The receiving device according to claim 1, wherein a starting position of a time duration of the. extended FFT duration signal is the same as a starting position of an FFT duration signal.

7. The receiving device according to claim 1, wherein the extended FFT duration signal takes a starting of a time duration extracting a signal as a leading edge of a previous path and takes an ending of the time duration as a trailing edge of a maximum-delay path signal.

8. The receiving device according to claim 1, wherein the extended FFT duration extraction unit is configured to multiply an extracted signal duration by a window function.

9. The receiving device according to claim 1, wherein the reconstruction unit is configured to extract a subcarrier component of the frequency-domain signal transformed by the time-to-frequency transformation unit, and add to a signal of the extracted subcarrier component a subcarrier component of a replica signal of a desired signal.

10. The receiving device according to claim 1, wherein the reconstruction unit is configured to extract a subcarrier component of the frequency-domain signal transformed by the time-to-frequency transformation unit, and add to a signal of the extracted subcarrier component a subcarrier component that is a subcarrier component of a replica signal of a desired signal and that is in proximity to the subcarrier.

11. The receiving device according to claim 1, wherein the receiving device comprises a plurality of antennas and is configured to perform communication with a transmission device by Multiple-Input-Multiple-Output (MIMO) transmission.

12. The receiving device according to claim 11, further comprising:
a demodulator configured to perform MIMO separation based on the propagation channel estimation value.

13. The receiving device according to claim 12, wherein
the receiving device is configured to receive, as the received signal, signals of signal streams transmitted from each of a plurality of antennas of the transmission device,
the filter unit is configured to generate a received signal replica that is a replica of the received signal in the time domain, based on the propagation channel estimation value and the symbol replica,
the subtraction unit is configured to subtract the received signal replica from the received signal,
the extended FFT duration extraction unit is configured to extract from the signal subtracted by the subtraction unit a signal of a time duration of an arbitration length,
the time-to-frequency transformation unit is configured to transform the signal of time duration extracted by the extended FFT duration extraction unit into a frequency-domain signal,
the reconstruction unit is configured to generate a replica signal of a desired signal, based on the propagation channel estimation value and the symbol replica, add the replica signal of the desired signal to the frequency-domain signal that has been transformed by the time-to-frequency transformation unit, and extract each subcarrier signal component of the received signal in a time duration of an arbitrary length, and
the reconstruction unit is configured to extract the subcarrier component of the frequency-domain signal transformed by the time-to-frequency transformation unit, and add to the signal of the extracted subcarrier component a desired stream component of the subcarrier component of the replica signal of the desired signal.

14. The receiving device according to claim 12, wherein
the receiving device is configured to receive, as the received signal, signals of signal streams transmitted from each of a plurality of antennas of the transmission device,
the filter unit is configured to generate a received signal replica that is a replica of the received signal in the time domain, based on the propagation channel estimation value and the symbol replica,
the subtraction unit is configured to subtract the received signal replica from the received signal,
the extended FFT duration extraction unit is configured to extract from the signal subtracted by the subtraction unit a signal of time duration of an arbitration length,
the time-to-frequency transformation unit is configured to transform the signal of time duration extracted by the extended FFT duration extraction unit into a frequency-domain signal,
the reconstruction unit is configured to generate a replica signal of a desired signal, based on the propagation channel estimation value and the symbol replica, add the replica signal of the desired signal to the frequency-domain signal that has been transformed by the time-to-frequency transformation unit, and extract each subcarrier signal component of the received signal in a time duration of an arbitrary length, and
the reconstruction unit is configured to extract the subcarrier component of the frequency-domain signal transformed by the time-to-frequency transfollnation unit, and add to the signal of the extracted subcarrier component all of the stream components of the subcarrier components of the replica signal of the desired signal.

15. The receiving device according to claim 1, further comprising:
a demodulator configured to demodulate a signal using a minimum mean square error reference.

16. A receiving method comprising:
extracting, by a signal extraction unit, a signal of an arbitrary time duration using a received signal and a received signal replica that is a replica of the received signal in the time domain obtained from a bit-log likelihood ratio obtained by receiving processing at least one time, and performing a time-to-frequency transform on the extracted signal so as to obtain each subcarrier signal of the received signal in which at least intercarrier interference is suppressed;
estimating, by a propagation channel estimation unit, a propagation channel so as to determine a propagation channel estimation value; and
generating, by a symbol replica generation unit, a symbol replica that is a replica of a modulated symbol from the bit-log likelihood ratio,
wherein the signal extraction unit performs:
generating, by a filter unit, the received signal replica, based on the propagation channel estimation value and the symbol replica;
subtracting, by a subtraction unit, the received signal replica from the received signal;
extracting, by an extended Fast Fourier Transform (FFT) duration extraction unit, from the signal subtracted by the subtraction unit an extended FFT duration signal that is a signal of time duration of arbitrary length so as to generate an FFT signal from the extended FFT duration signal;
transforming, by a time-to-frequency transformation unit, the FFT signal into a frequency-domain signal; and
generating, by a reconstruction unit, a subcarrier replica signal, based on the propagation channel estimation value and the symbol replica, and adding the subcarrier replica signal to the frequency-domain signal transformed by the time-to-frequency transformation unit, so as to obtain each subcarrier signal of the received signal,
wherein each of said signal extraction unit, said propagation channel estimation unit, and said symbol replica generation unit comprise a circuit.

17. A non-transitory computer readable medium causing a computer of a receiving device to perform:
extracting a signal of an arbitrary time duration using a received signal and a received signal replica that is a replica of the received signal in the time domain obtained from a bit-log likelihood ratio obtained by receiving processing at least one time;

performing a time-to-frequency transform on the extracted signal so as to obtain each subcarrier signal of the received signal in which at least intercarrier interference is suppressed;

estimating a propagation channel so as to determine a propagation channel estimation value;

generating a symbol replica that is a replica of a modulated symbol from the bit-log likelihood ratio;

generating the received signal replica, based on the propagation channel estimation value and the symbol replica;

subtracting the received signal replica from the received signal;

extracting from the subtracted signal an extended Fast Fourier Transform (FFT) duration signal that is a signal of time duration of arbitrary length so as to generate an FFT signal from the extended FFT duration signal;

transforming the FFT signal into a frequency-domain signal; and generating a subcarrier replica signal, based on the propagation channel estimation value and the symbol replica, and adding the subcarrier replica signal to the transformed frequency-domain signal, so as to obtain each subcarrier signal of the received signal.

18. A processor comprising:

a signal extraction unit configured to extract a signal of an arbitrary time duration using a received signal and a received signal replica that is a replica of the received signal in the time domain obtained from a bit-log likelihood ratio obtained by receiving processing at least one time, and perform a time-to-frequency transform on the extracted signal so as to obtain each subcarrier signal of the received signal, in which at least intercarrier interference is suppressed;

a propagation channel estimation unit configured to estimate a propagation channel so as to determine a propagation channel estimation value; and a symbol replica generation unit configured to generate a symbol replica that is a replica of a modulated symbol from the bit-log likelihood ratio, wherein the signal extraction unit comprises:

a filter unit configured to generate the received signal replica, based on the propagation channel estimation value and the symbol replica;

a subtraction unit configured to subtract the received signal replica from the received signal;

an extended Fast Fourier Transform (FFT) duration extraction unit configured to extract from the signal subtracted by the subtraction unit an extended FFT duration signal that is a signal of time duration of arbitrary length so as to generate an FFT signal from the extended FFT duration signal;

a time-to-frequency transformation unit configured to transform the FFT signal into a frequency-domain signal; and a reconstruction unit configured to generate a subcarrier replica signal, based on the propagation channel estimation value and the symbol replica, and add the subcarrier replica signal to the frequency-domain signal transformed by the time-to-frequency transformation unit, so as to obtain each subcarrier signal of the received signal, wherein said signal extraction unit, said propagation channel estimation unit, and said symbol replica generation unit comprise a computer executing software.

* * * * *